(12) United States Patent
Freydin et al.

(10) Patent No.: US 11,656,096 B1
(45) Date of Patent: May 23, 2023

(54) INERTIAL MEASUREMENT UNIT (IMU) BASED VEHICLES TRACKING

(71) Applicant: ALMA Technologies Ltd., Haifa (IL)

(72) Inventors: Maxim Freydin, Haifa (IL); Barak Or, Haifa (IL); Gev Ben Haim, Hatzor Ashdod (IL)

(73) Assignee: ALMA Technologies Ltd., Haifa (IL)

( * ) Notice: Subject to any disclaimer, the term of this patent is extended or adjusted under 35 U.S.C. 154(b) by 0 days.

(21) Appl. No.: 17/731,496

(22) Filed: Apr. 28, 2022

(51) Int. Cl.
*G01C 21/00* (2006.01)
*G01C 21/34* (2006.01)

(52) U.S. Cl.
CPC ..... *G01C 21/3844* (2020.08); *G01C 21/3461* (2013.01); *G01C 21/3492* (2013.01)

(58) Field of Classification Search
CPC .............................................. G01C 21/10–188
USPC ................................ 701/400–541, 500–512
See application file for complete search history.

(56) References Cited

U.S. PATENT DOCUMENTS

| | | | | |
|---|---|---|---|---|
| 2001/0034577 A1* | 10/2001 | Grounds | ............... | G08G 1/20 340/988 |
| 2011/0246025 A1* | 10/2011 | Ishihara | ............... | G08G 1/20 701/36 |
| 2015/0127247 A1* | 5/2015 | Xu | ............... | G01C 21/34 701/411 |
| 2016/0341562 A1* | 11/2016 | Samsonov | ............. | G01C 21/32 |
| 2019/0186926 A1* | 6/2019 | Koponen | ............... | G01C 21/32 |
| 2019/0186927 A1* | 6/2019 | Koponen | ............... | G01C 21/32 |
| 2019/0289125 A1* | 9/2019 | Mosenia | ........... | H04M 1/72454 |
| 2021/0276571 A1* | 9/2021 | Breton | ............... | B60W 40/105 |
| 2021/0396522 A1* | 12/2021 | Price | ................ | G01C 21/1654 |

(Continued)

FOREIGN PATENT DOCUMENTS

| | | | | |
|---|---|---|---|---|
| CN | 112747744 A | * | 5/2021 | ............. G01C 21/30 |
| WO | WO-2011132498 A1 | * | 10/2011 | ............. G01C 21/30 |

OTHER PUBLICATIONS

S. Narain, T. D. Vo-Huu, K. Block and G. Noubir, "Inferring User Routes and Locations Using Zero-Permission Mobile Sensors," 2016 IEEE Symposium on Security and Privacy (SP), 2016, pp. 397-413, doi: 10.1109/SP.2016.31. (Year: 2016).*

(Continued)

*Primary Examiner* — Jeffrey C Boomer
*Assistant Examiner* — Paul Allen

(57) ABSTRACT

A method of tracking ground vehicles based on Inertial Measurement Unit (IMU) data, comprising accumulating motion data captured by IMU(s) deployed in a vehicle, the motion data captured periodically in a plurality of time points starting from a known initial location of the vehicle comprises at least acceleration and angular velocity, computing, based on the motion data, a measured heading angle time-series of the vehicle expressing a movement direction of the vehicle over time, analyzing map data of an area of the known initial location to identify candidate routes, simulating, based on the map data, a simulated heading angle time-series for each candidate route expressing a simulated movement direction along the respective candidate route over time, ranking the candidate routes based on match between each simulated heading angle time-series and the measured heading angle time-series, and estimating a location of the vehicle based on the ranking.

17 Claims, 9 Drawing Sheets

(56) References Cited

U.S. PATENT DOCUMENTS

2022/0080853 A1* 3/2022 Goldfarb ................ B60L 8/006

OTHER PUBLICATIONS

Z. Li, Q. Pei, I. Markwood, Y. Liu, M. Pan and H. Li, "Location Privacy Violation via GPS-Agnostic Smart Phone Car Tracking," in IEEE Transactions on Vehicular Technology, vol. 67, No. 6, pp. 5042-5053, Jun. 2018, doi: 10.1109/TVT.2018.2800123. (Year: 2018).*

Wi-Fi—Wikipedia: copy of https://en.wikipedia.org/wiki/Wi-Fi captured byarchive.org, Mar. 5, 2020. (Year: 2020).*

OpenStreetMap—Wikipedia: copy of https://en.wikipedia.org/wiki/OpenStreetMap captured by archive.org, Feb. 21, 2020. (Year: 2020).*

C. Roth, N. T. Dinh, M. Roßerger and D. Kesdoğan, "DaRoute: Inferring trajectories from zero-permission smartphone sensors," 2021 18th International Conference on Privacy, Security and Trust (PST), 2021, pp. 1-10, doi: 10.1109/PST52912.2021.9647811. (Year: 2021).*

Qian Q—English description of CN-112747744-A via Espacenet Patent Translate, retrieved Jun. 14, 2022. (Year: 2022).*

Kawase Akinori—English description of WO-2011132498-A1 via Espacenet Patent Translate, retrieved Jun. 16, 2022. (Year: 2022).*

S. Narain, T. D. Vo-Huu, K. Block and G. Noubir, "The Perils of User Tracking Using Zero-Permission Mobile Apps," in IEEE Security & Privacy, vol. 15, No. 2, pp. 32-41, Mar.-Apr. 2017, doi: 10.1109/MSP.2017.25. (Year: 2017).*

* cited by examiner

102 — RECEIVE MOTION DATA CAPTURED BY IMU(s) OF A VEHICLE STARTING FROM A KNOWN INITIAL LOCATION

104 — ACCUMULATE THE MOTION DATA OVER TIME

106 — COMPUTE A MEASURED HEADING ANGLE TIME-SERIES BASED ON THE MOTION DATA

108 — OBTAIN MAP DATA OF AN AREA SURROUNDING THE INITIAL LOCATION OF THE VEHICLE

110 — ANALYZE THE MAP DATA TO IDENTIFY A PLURALITY OF CANDIDATE ROUTES STARTING FROM THE INITIAL LOCATION

112 — SIMULATE A SIMULATED HEADING ANGLE TIME-SERIES FOR A EACH CANDIDATE ROUTE

114 — OPTIMIZE A MATCH BETWEEN EACH SIMULATED HEADING ANGLE TIME-SERIES AND THE MEASURED HEADING ANGLE TIME-SERIES

116 — RANK THE SIMULATED HEADING ANGLE TIME-SERIES BASED ON THEIR MATCH

118 — ESTIMATE A LOCATION OF THE VEHICLE BASED ON THE RANKING

FIG. 1

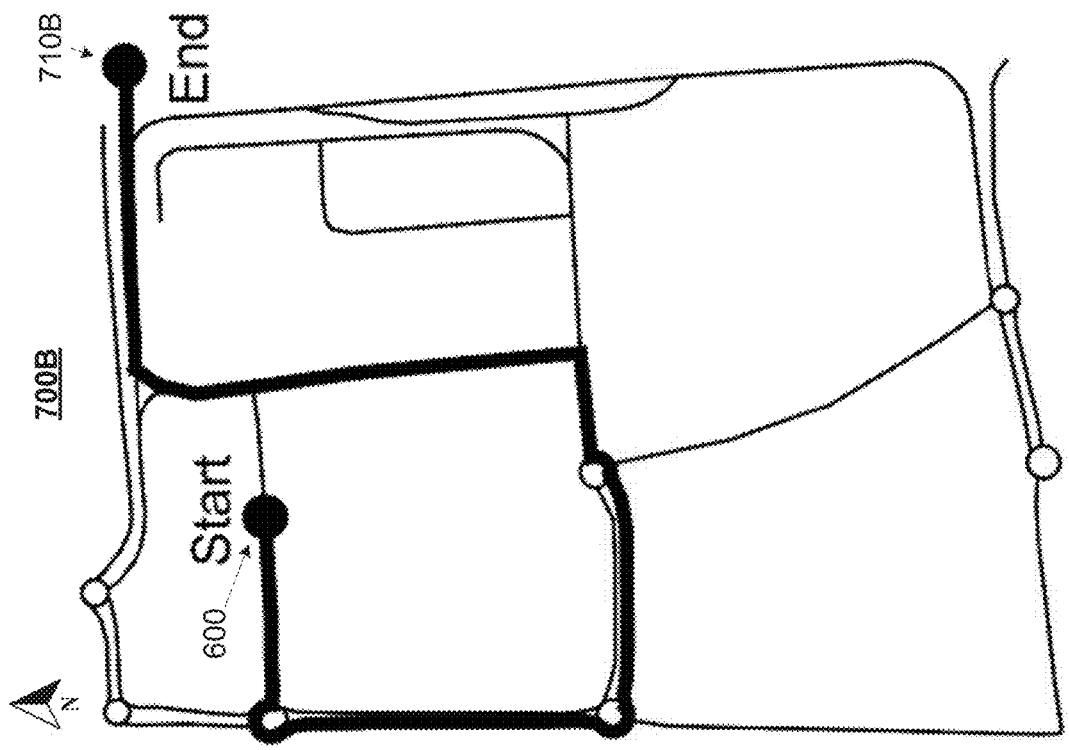
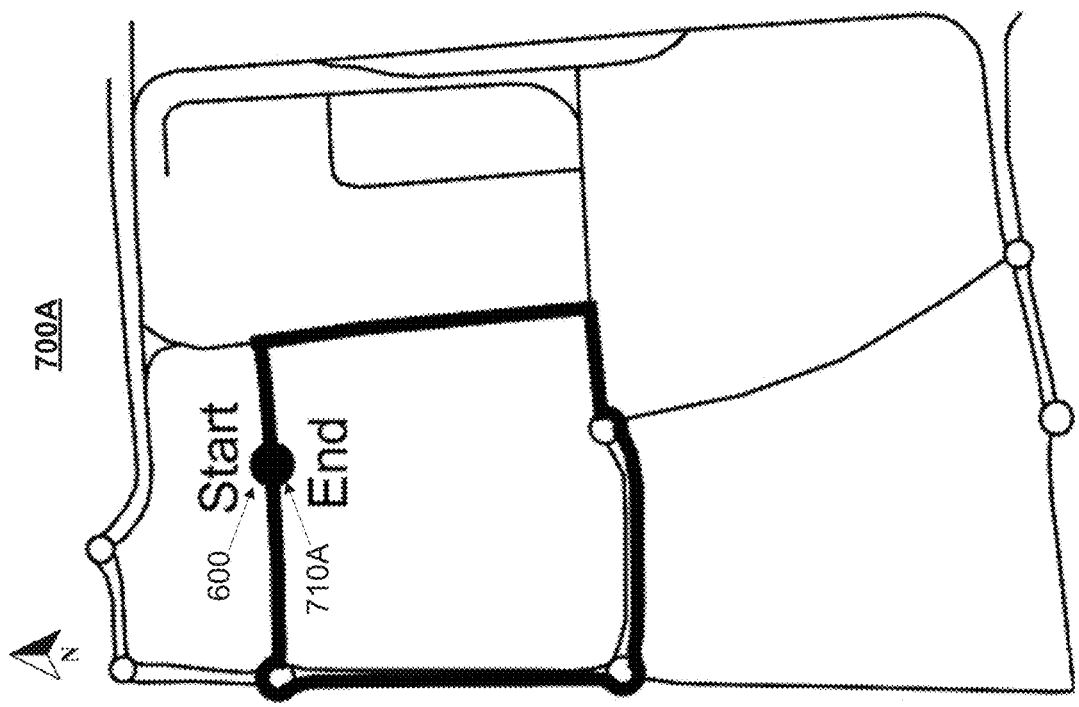
FIG. 7A

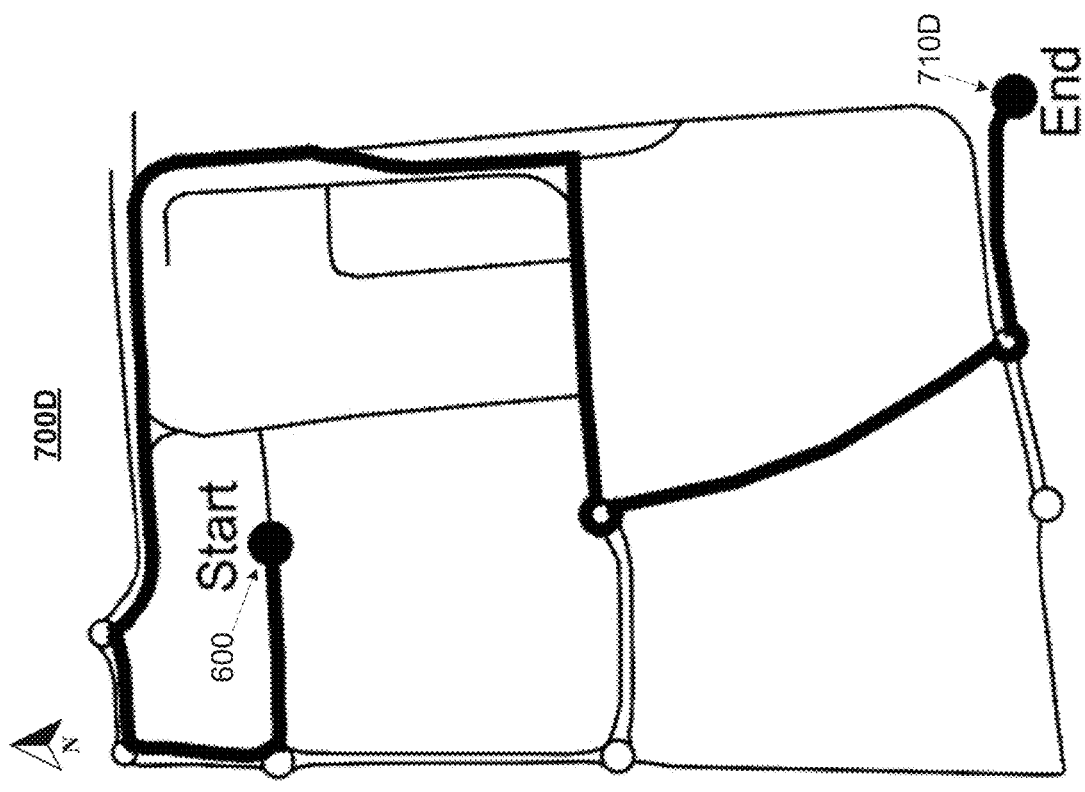
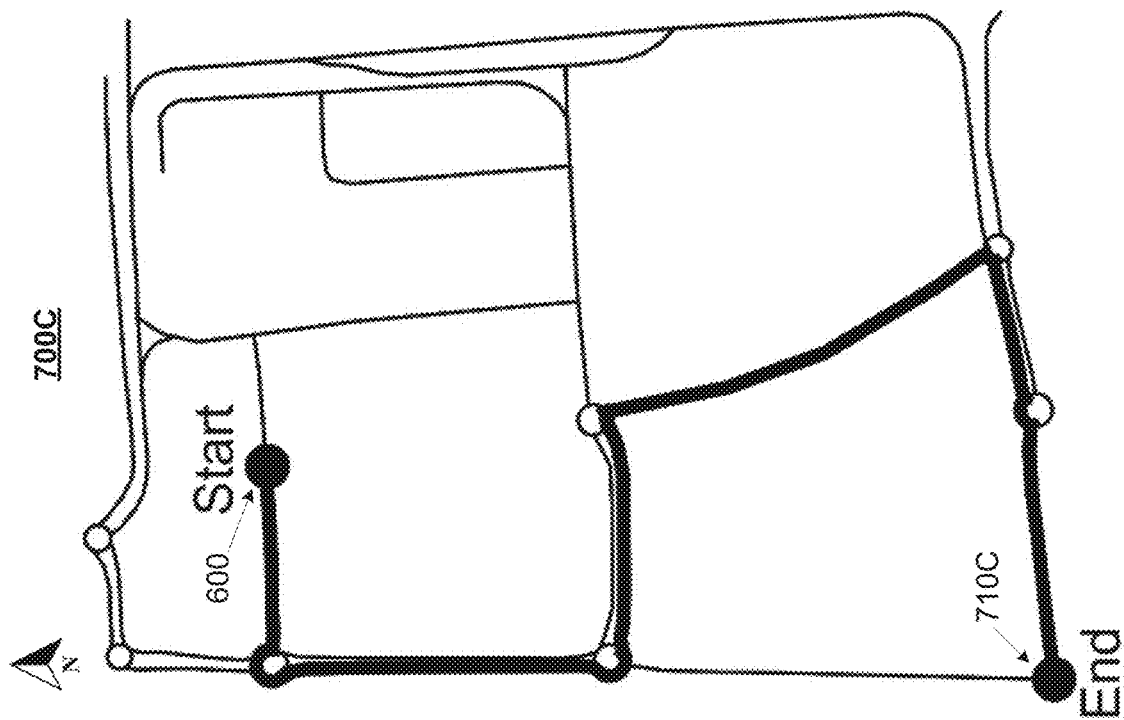
FIG. 7B

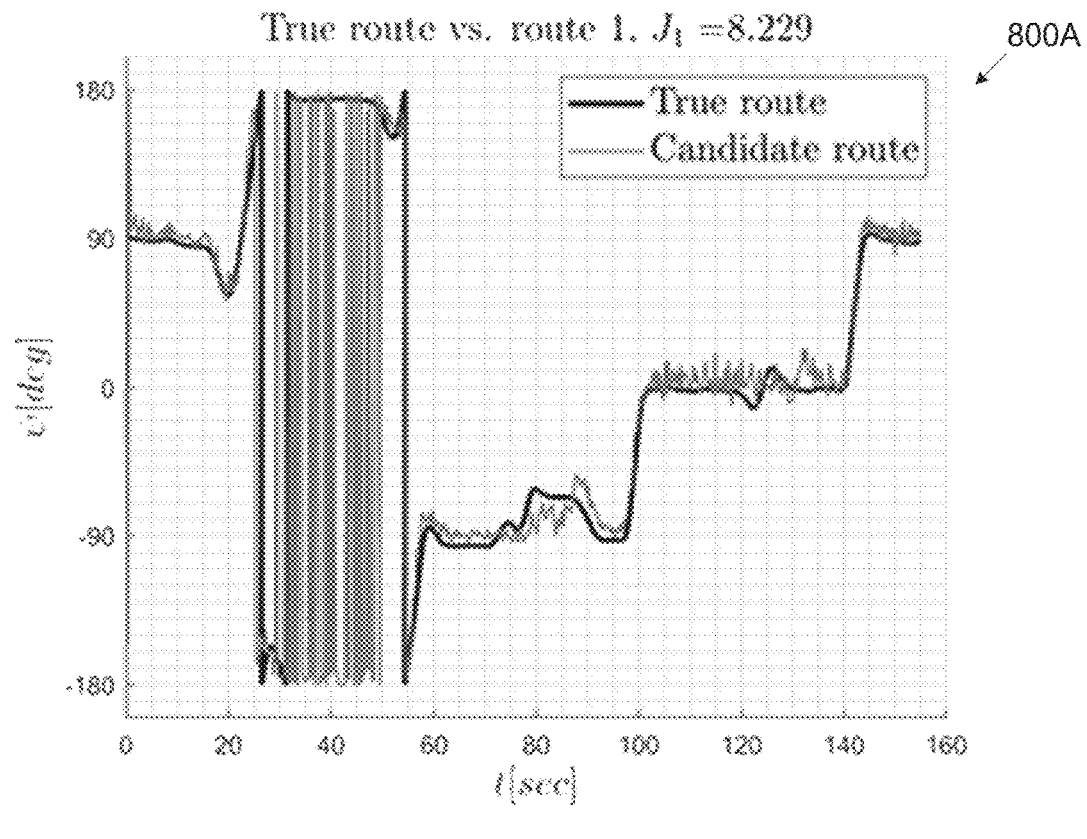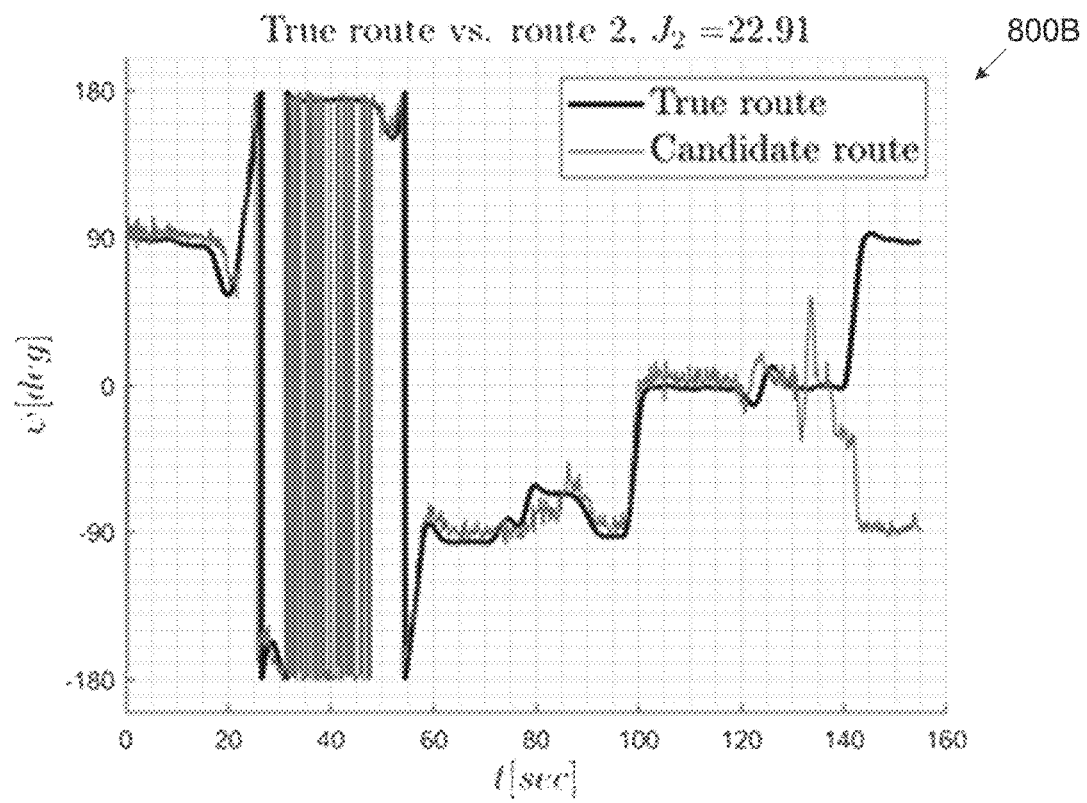
FIG. 8A

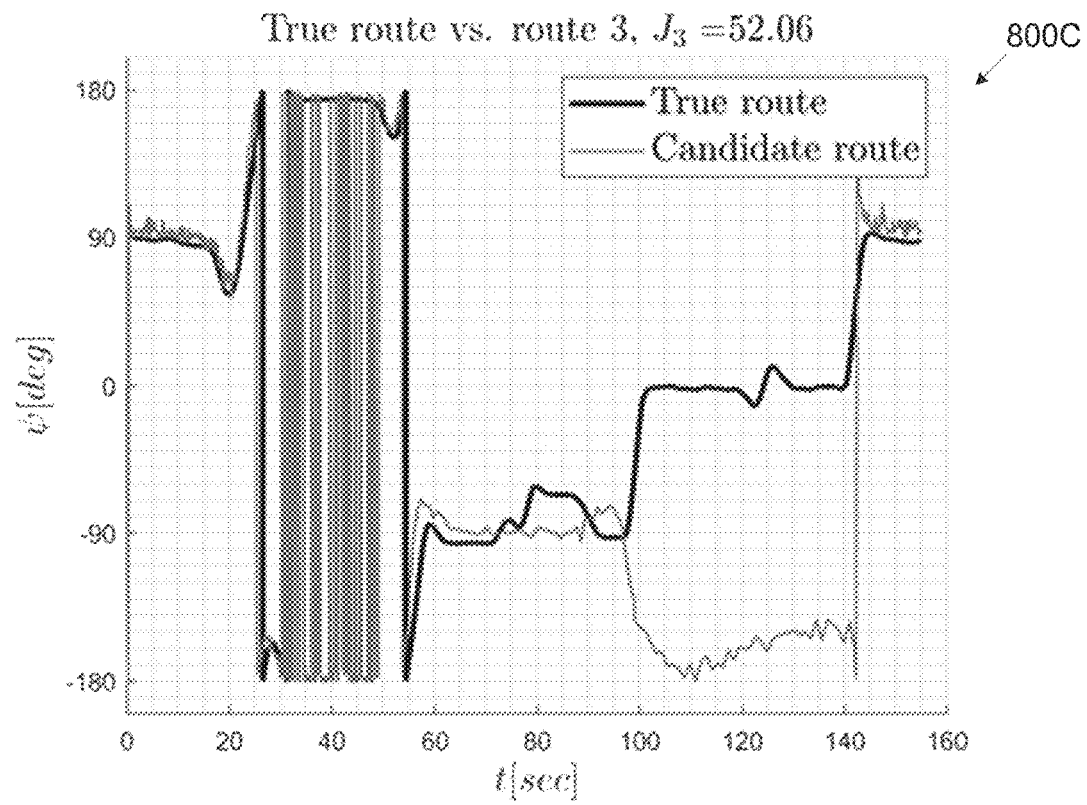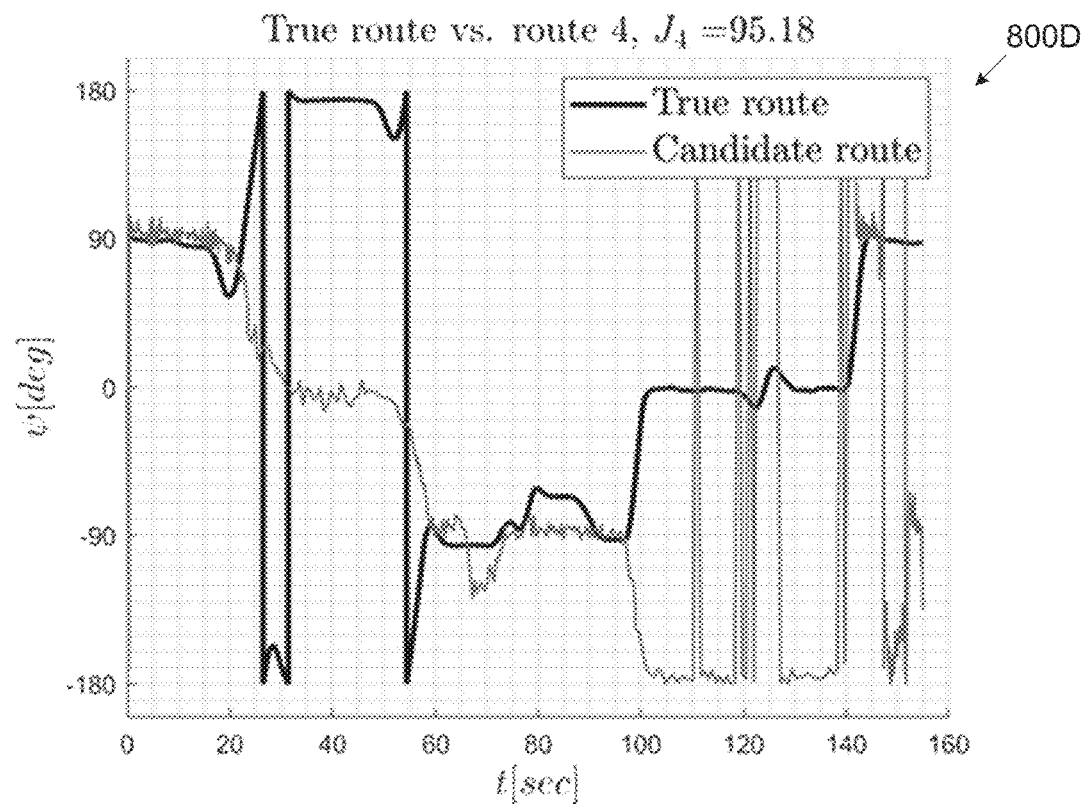
FIG. 8B

INERTIAL MEASUREMENT UNIT (IMU) BASED VEHICLES TRACKING

FIELD AND BACKGROUND OF THE INVENTION

The present invention, in some embodiments thereof, relates to tracking and locating vehicles, and, more specifically, but not exclusively, to tracking and locating vehicles having no access to geolocation services based on motion data captured by IMU units deployed in the vehicles.

Tracking vehicles, in particular ground vehicles may be needed and even essential for a plurality of applications and use cases ranging from traffic control, through vehicle safety to tracking and recovering stolen vehicles.

Vehicles may be typically tracked based on geolocation data received from the vehicles which is captured by one or more geolocation sensors, devices and/or systems (collectively designated geolocation sensors herein after) which are deployed in the vehicles. Such geolocation sensors may be configured to determine their location based on signals transmitted by one or more geolocation services known as Global Navigation Satellite Systems (GNSS) such as, for example, US's Global Positioning System (GPS), Russia's Global Navigation Satellite System (GLONASS), China's BeiDou Navigation Satellite System, the European Union's Galileo and/or the like.

SUMMARY OF THE INVENTION

According to a first aspect of the present invention there is provided a method of tracking ground vehicles based on inertial measurement unit (IMU) data, comprising using one or more processors for:

Accumulating motion data captured by one or more IMUs deployed in one or more vehicles, the motion data captured periodically in a plurality of time points starting from a known initial location of the one or more vehicles comprises at least acceleration and angular velocity.

Computing, based on the motion data, a measured heading angle time-series of the one or more vehicles expressing a movement direction of the one or more vehicles over time.

Analyzing map data of an area surrounding the known initial location to identify a plurality of candidate routes.

Simulating, based on the map data, a respective simulated heading angle time-series for each of the plurality of candidate routes expressing a simulated movement direction along the respective candidate route over time.

Ranking the plurality of candidate routes based on a match between each simulated heading angle time-series and the measured heading angle time-series.

Estimating a location of the one or more vehicles based on the ranking.

According to a first aspect of the present invention there is provided a system for tracking ground vehicles based on inertial measurement unit (IMU) data, comprising one or more processors configured to execute a code. The code comprising:

Code instructions to accumulate motion data captured by one or more IMUs deployed in one or more vehicles. The motion data captured periodically in a plurality of time points starting from a known initial location of the one or more vehicle comprises at least acceleration and angular velocity.

Code instructions to compute, based on the accumulated motion data, a measured heading angle time-series of the one or more vehicles expressing a movement direction of the one or more vehicles over time.

Code instructions to analyze map data of an area surrounding the known initial location to identify a plurality of candidate routes.

Code instructions to simulate, based on the map data, a respective simulated heading angle time-series for each of the plurality of candidate routes expressing a simulated movement direction along the respective candidate route over time.

Code instructions to rank the plurality of candidate routes based on a match between each simulated heading angle time-series and the measured heading angle time-series.

Code instructions to estimate a location of the one or more vehicles based on the ranking.

In a further implementation form of the first and/or second aspects, the location of the one or more vehicles is estimated based on current location extracted from one or more highest ranking candidate route of the plurality of candidate routes.

In a further implementation form of the first and/or second aspects, the motion data captured by the one or more IMU is received from the one or more vehicles via one or more Radio Frequency (RF) communication channels.

In a further implementation form of the first and/or second aspects, the motion data is locally stored in the one or more vehicles while the one or more RF communication channels are unavailable. The stored motion data is transmitted when communication via the one or more RF communication channels is resumed.

In a further implementation form of the first and/or second aspects, the motion data is received is a plurality of data segments. The plurality of data segments are combined to restore the motion data.

In a further implementation form of the first and/or second aspects, the match between the simulated heading angle time-series of each of the plurality of candidate routes and the measured heading angle time-series is computed by:

Simulating a heading angle of the one or more vehicles at each of a plurality of location points along the respective candidate route. The plurality of location points corresponding to the plurality of time points.

Aggregating the heading angle at the plurality of location points according to the plurality of time points to generate an initial respective simulated heading angle time-series.

Computing a difference, at each of the plurality of time points, between a value of the heading angle of the respective simulated heading angle time-series and a value of the heading angle of the measured heading angle time-series.

Minimizing the difference by adjusting a location of one or more of the plurality of location points.

In a further implementation form of the first and/or second aspects, in case the motion data does not include an initial heading angle expressed with respect to a known direction, the minimized difference further expresses a constant offset between an initial heading angle assumed for the respective simulated heading angle time-series and an actual heading angle of the measured heading angle time-series.

In an optional implementation form of the first and/or second aspects, one or more estimated initial heading angles are selected according to road geometry at the known initial location.

In a further implementation form of the first and/or second aspects, the one or more IMUs are calibrated according to frame of reference of the one or more vehicles.

In an optional implementation form of the first and/or second aspects, an ordered list of a predefined number of candidate routes of the plurality of candidate routes is created based on the ranking.

In an optional implementation form of the first and/or second aspects, the measured heading angle time-series is updated according to newly received motion data and repeating estimation of the route of the one or more vehicles based on the updated measured heading angle time-series.

In a further implementation form of the first and/or second aspects, the motion data captured by the one or more IMUs further comprising heading data expressing a heading of the one or more vehicles with respect to a reference direction.

In a further implementation form of the first and/or second aspects, the motion data captured by the one or more IMUs further comprising velocity data expressing a velocity of the one or more vehicles.

In a further implementation form of the first and/or second aspects, the one or more IMUs are calibrated according to frame of reference of the one or more vehicles.

In an optional implementation form of the first and/or second aspects, one or more of the plurality of candidate routes which express an unrealistic velocity of the one or more vehicles are discarded. The unrealistic velocity which exceeds typical maximal velocity of vehicles is measured based on a distance between location points extracted from the map data.

In an optional implementation form of the first and/or second aspects, one or more of the plurality of candidate routes which do not cross one or more geographical locations identified for the one or more vehicles. The one or more geographical location are identified based on geolocation data captured by one or more geolocation sensors deployed in the one or more vehicles.

In an optional implementation form of the first and/or second aspects, one or more of the plurality of candidate routes which cross the one or more geographical locations at a time deviating by more than a certain threshold from a time reported for the one or more vehicles being at the one or more geographical locations are discarded.

In an optional implementation form of the first and/or second aspects, one or more of the plurality of candidate routes having a simulated pitch angle deviating by a certain threshold from a measured pitch angle computed for the one or more vehicles based on the motion data in one or more of the plurality of time points are discarded. The pitch angle expresses a slope ascend or descend of the one or more vehicles.

In an optional implementation form of the first and/or second aspects, one or more off-road candidate routes are evaluated by:

Analyzing the map data of the area surrounding the known initial location to identify the one or more off-road candidate routes. The map data comprising terrain data relating to potential off-road paths in the area surrounding the known initial location.

Computing a respective simulated heading angle time-series of a simulated vehicle moving in the one or more off-road candidate routes.

Ranking the one or more off-road candidate routes based on the match between their simulated heading angle time-series and the measured heading angle time-series.

In a further implementation form of the first and/or second aspects, one or more of the vehicles are stolen vehicles and the simulated route is computed to track the stolen vehicles.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings:

FIG. 1 is a flowchart of an exemplary process of tracking and estimating location of vehicles based on motion data captured by IMUs deployed in the vehicles, according to some embodiments of the present invention;

Figure 6:
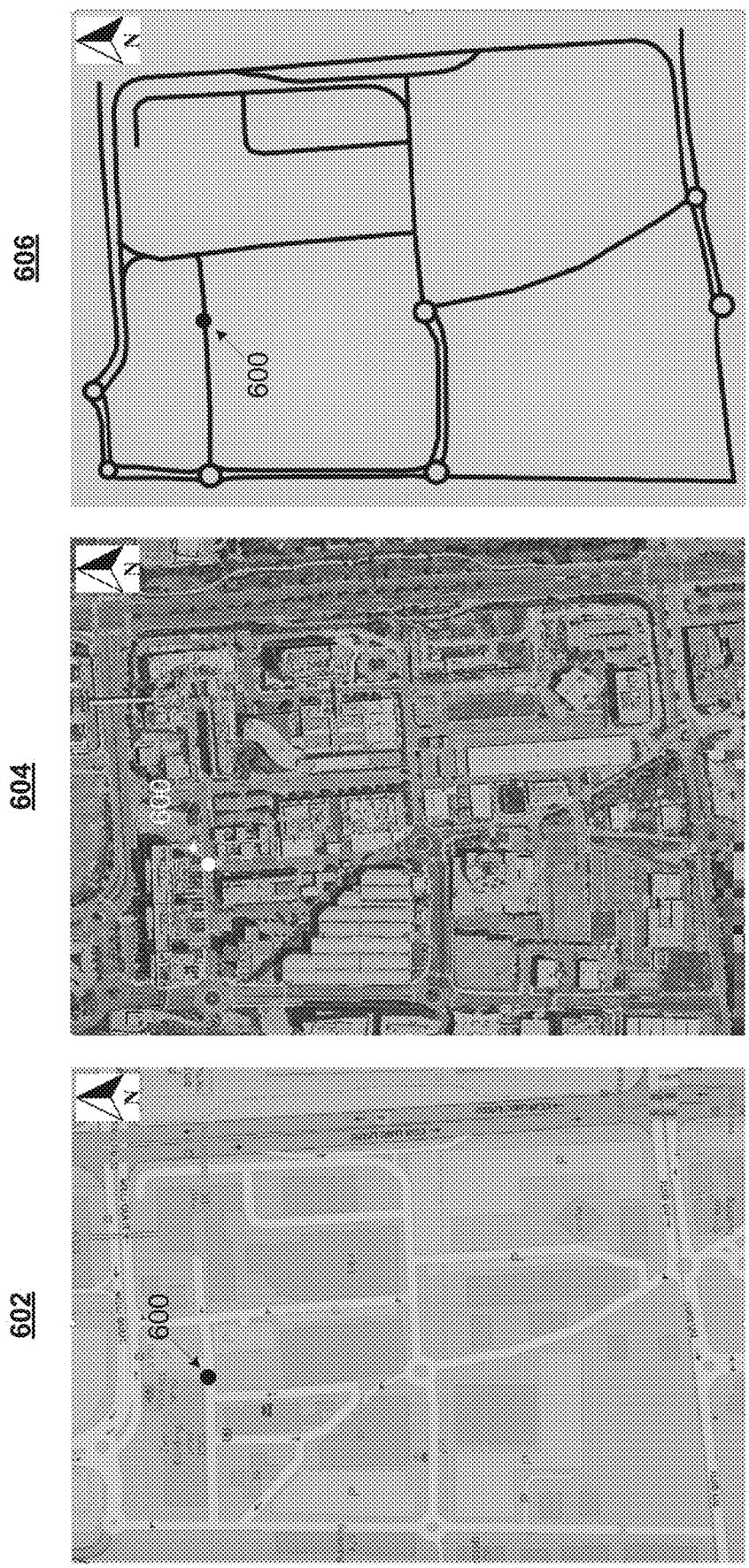

FIG. 6 presents schematic illustrations of exemplary map data used for tracking and estimating location of vehicles based on motion data captured by IMUs deployed in the vehicles, according to some embodiments of the present invention;

FIG. 7A and FIG. 7B are schematic illustration of candidate routes of a vehicle from an initial known location identified by analyzing map data, according to some embodiments of the present invention; and FIG. 8A and FIG. 8B are graph charts illustrating matching between simulated angle heading time-series simulated for candidate routes of a vehicle and a measured angle heading time-series of the vehicle computed according to motion data captured by an IMU deployed in the vehicle, according to some embodiments of the present invention.

DESCRIPTION OF SPECIFIC EMBODIMENTS OF THE INVENTION

The present invention, in some embodiments thereof, relates to tracking and locating vehicles, and, more specifically, but not exclusively, to tracking and locating vehicles having no access to geolocation services based on motion data captured by IMU units deployed in the vehicles.

Vehicles in general, and ground vehicles (e.g. cars, trucks, buses, motorcycles, bicycles, etc.) in particular, may be typically tracked based on their geolocation. One or more geolocation sensors deployed in each vehicle may intercept signals of one or more the geolocation services, for example, GNSS, which may be used to compute and determine the location of the vehicle accordingly.

The vehicles may then transmit their geolocation data via one or more Radio Frequency (RF) communication channels (wireless channels), for example, a cellular network and/or the like to one or more tracking systems, services and/or platforms configured to track the vehicles accordingly.

However, there may be scenarios and/or situation when it is impossible to track vehicles based on their geolocation due to lack of geolocation data relating to these vehicles. The primary scenario when geolocation data may be unavailable for vehicles may relate to theft incidents when vehicles are stolen. In such incidents the geolocation service (e.g. GNSS) signal may be jammed thus preventing the geolocation sensor(s) deployed in the vehicles to receive the signal. Alternatively, and/or additionally, one or more of the geolocation sensor(s) deployed in the stolen vehicle may be tampered and at least partially disabled to prevent it from receiving the geolocation service signal.

However, while lack of geolocation data may be primarily characteristic to scenarios of stolen vehicles, the geolocation data may be unavailable for one or more vehicles due to one or more other reasons, for example, bad weather conditions (e.g. rain, snow, etc.), failed geolocation sensor(s), and/or the like.

According to some embodiments of the present invention, there are provided methods, systems and computer program products for tracking and locating vehicles, specifically ground vehicles based on motion data rather than based on geolocation data where the motion data, for example, acceleration, angular velocity, velocity, heading (movement direction) and/or the like captured by IMUs deployed in the vehicles.

As known in the art, while the geolocation service signals may be easily jammed either deliberately by car thieves or due to environmental conditions, it may be significantly more difficult to jam the wireless communication channel(s) signal at the vehicles which are highly robust against jamming and/or extreme weather effects.

However, while these vehicles may not be tracked, their initial location may be known, i.e., their last location before stolen and losing the geolocation serviced signal, their last location before deterioration of the environmental conditions and/or the like.

Tracking such vehicles for which no geolocation data is available may be therefore done based on their last known location, i.e., their initial location and according to the motion data captured by the IMU(s) deployed in the vehicles and transmitted by the vehicles to one or more remote tracking systems via the RF communication channel(s).

Specifically, the tracking system may track one or more of the vehicles based on a heading angle, i.e., movement direction, of each vehicle over time which may be highly indicative of the route travelled (followed) by the respective vehicle. This is because, assuming the route of the vehicle comprises curves, turns and/or the like, variation (change) of the heading angle over time may form a time signal signature indicative of the route of the vehicle.

The tracking system tracking a vehicle may compute and/or estimate the heading angle of the tracked vehicle based on motion data received from the respective vehicle accumulated during the trip of the vehicle where the motion data may include at least acceleration data and angular velocity data. Specifically, the tracking system may compute a measured heading angle time-series expressing the heading angle of the vehicle at a plurality of time points during the trip of the vehicle. The plurality of time points may optionally correspond to sampling times when the motion data is sampled (measured) by the IMU(s) deployed in the vehicle.

Optionally, one or more of the vehicles may locally store the motion data captured by their IMU(s) while the RF communication channel(s) is not available and communication with the tracking system is lost. When communication with the tracking system is resumed, the vehicle(s) may transmit the stored motion data which may be used by the tracking system to track the vehicle(s).

The tracking system may analyze map data, for example, maps, imagery data, road network descriptions, and/or the like surrounding the known initial location of the vehicle to identify a plurality of candidate route that a (simulated) vehicle may follow (travel) starting from the known initial location. Each candidate route may be constructed of a plurality of location points defining the candidate route according to the map data.

The tracking system may simulate the heading angle of a simulated vehicle travelling each of the candidate routes by computing a simulated heading angle time-series for each candidate route at a plurality of location points corresponding to the plurality of time points. The tracking system may compute and/or estimate the heading angle of the simulated vehicle at each location point according to the road geometry at the respective location point determined based on the analysis of the map data. Each simulated heading angle time-series may thus express the movement direction of the simulated vehicle riding along the respective candidate route over time, specifically at the plurality of time points during the trip of the vehicle. Each simulated heading angle time-series may therefore also form a time signal signature of the respective candidate route.

The tracking system may then compute a match (score) between the respective simulated heading angle time-series of each of the candidate routes and the measured heading angle time-series. The tracking system may compute the match score for each simulated heading angle time-series using one or more scoring algorithms and/or functions configured to compute a difference between the heading angles of the respective simulated heading angle time-series and the heading angle of the measured heading angle time-series over all of the time points.

Moreover, the tracking system may apply one or more optimization algorithms configured to minimize the difference computed for one or more of the candidate routes by adjusting a location (distribution) of one or more of the location points along the respective candidate route. The adjusted distribution of location points along a candidate route may reflect different speeds of the simulated vehicle travelling along the respective candidate route. Adjusting the distribution of the location points along a candidate route may therefore affect the heading angle of the simulated vehicle at these location points due to different road geometry at the adjusted location points which may better match the actual location points of the tracked vehicle as reflected in the heading angles of the measured heading angle time-series computed for the tracked vehicle.

In case the motion data received from the vehicle comprises heading data, i.e., the heading angle (movement direction) of the vehicle with respect to a known reference, for example, the true north, the tracking system may identify the initial heading angle of the vehicle. in such case, the tracking system may compute the match between the simulated heading angle time-series of each of the candidate routes and the measured heading angle time-series according to an absolute value computed based on the known initial heading. However, in case the initial heading angle is unknown, the tracking system may compute the match with respect to a certain constant offset expressing the unknown initial heading angle.

Optionally, the tracking system may discard (eliminate, drop) one or more unrealistic, improbable and/or impossible candidate routes. For example, based on the motion data received from the vehicle for at least some of the time points, the tracking system may determine that the simulated vehicle travelling along one or more of the candidate routes may need to move at an unrealistic or impossible speed (velocity), for example, too fast or too slow, the tracking system may discard such candidate route(s). In another example, the tracking system may discard one or more candidate routes based on a pitch angle measured for the tracked vehicle based on the motion data which is indicative of the vehicle ascending/descending at a slope. The tracking system may discard candidate route(s) which do not cross slopes which may correspond to the pitch angle computed for the tracked vehicle. In another example, assuming a geolocation of the tracked vehicle is received from the vehicle, intermittently or even once, the tracking system may discard one or more candidate routes which do not cross the geolocation reported by the vehicle. the tracking system may also discard one or more candidate routes which do not cross the slope(s) and/or the geolocation at time corresponding to the times reported by the tracked vehicle.

The tracking system may then rank the plurality of candidate routes according to their match (scores). Moreover, based on the ranking of the candidate routes, the tracking system may estimate a (current) location of the vehicle. For example, the tracking system may estimate the location of the vehicle based on an end location or a current location extracted from one or more highest ranking candidate routes.

The tracking system may track one or more of the vehicles in real-time, i.e., while the vehicles are in motion or shortly after they stop to at least temporary destination points. However, the tracking system may alternatively and/or additionally track one or more of the vehicles post event to simulate their path in order to identify their final location which is possibly their current location.

Moreover, the tracking system may repeat the tracking process and/or extend it for one or more vehicles using new motion data received from the vehicles. Specifically, the tracking system may update the measured heading angle time-series and extend it according to the newly received motion data. The tracking system may also extend the candidate routes based on analysis of the map data and may update their simulated heading angle time-series accordingly. The tracking system may then evaluate the extended candidate routes based on the match between the updated measured heading angle time-series and the updated simulated heading angle time-series of the extended candidate routes.

Tracking vehicles based on motion data captured by IMUs deployed in the vehicle may present significant benefits and advantages compared to currently existing vehicle tracking methods and systems.

Most of the existing vehicle tracking systems are based on geolocation data received from the vehicles which is computed based on signals of one or more GNSS geolocation services intercepted by geolocation sensors deployed in the vehicles. The GNSS signals however, may be maliciously jammed by car thieves attempting to steal a vehicle. The GNSS signals may be also lost due to weather and/or environmental conditions, for example, rain, snow, and/or the like. Tracking systems relying on the geolocation data of the vehicles may be therefore highly unreliable in general, and for tracking stolen vehicles in particular. While jamming the GNSS signals may be significantly easy requiring simple equipment and no skill, maliciously jamming and/or disabling the RF communication channel(s) of the vehicle, for example the cellular network connectivity, may be significantly difficult and typically impossible. Tracking the vehicles based on the motion data captured by the their IMUs may be therefore highly robust and tamper resistant making highly suitable and effective for tracking and locating stolen vehicles.

Moreover, some of the exiting vehicle tracking systems and methods may use the motion data (e.g. acceleration, velocity, angler velocity, etc.) captured by the IMU(s) deployed in a vehicle in attempt to compute the actual route of the vehicle, fit the computed route to a map and track the vehicle accordingly. However, the computed route may be highly unreliable and inaccurate since it may quickly diverge from the real (actual) route of the vehicle when no updated motion data is constantly received from the vehicle at significantly high rate, for example, every 0.1, 0.2, 0.3 seconds and/or the like. In contrast, tracking the vehicle based on the candidate routes and the match between their simulated heading angle time-series and the measured heading angle time-series may be highly robust and effective even when the motion data is not received continuously, received intermittently, and/or received in delay. This advantage may be highly emphasized when tracking vehicles for a significantly long time, for example, more than 10 minutes.

Furthermore, since the vehicles may locally store their captured motion data when communication with the tracking system is lost and transmit the stored motion data when communication is resumed, the tracking system may effectively resume tracking of the vehicles despite the temporary loss of communication. This is in contrast to the existing vehicle tracking systems attempting to compute the actual route of the vehicle based on continuously received motion data.

In addition, discarding improbable, unrealistic and/or impossible candidate routes may significantly reduce computing resources of the tracking system, for example, processing resources, storage resources and/or the like since there is no need to compute simulated heading angle time-series for such discarded candidate routes and match them with the measured hearing angle time-series.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of tracking and estimating location of vehicles based on motion data captured by IMUs deployed in the vehicles, according to some embodiments of the present invention;

An exemplary process 100 may be executed to track and estimate a location of one or more vehicles based on motion data, for example, acceleration, angular velocity, velocity, heading (movement direction) and/or the like captured by one or more sensors deployed in the vehicles, for example, an IMU and/or the like.

Specifically, tracking a vehicle may be done starting from a known initial location (start point) of the vehicle by analyzing map data of the area surrounding the initial location and identifying a plurality of candidate routes the vehicle may follow.

Variation of a heading angle of each vehicle over time while following (traveling, riding) each of the candidate routes is a unique time signal signature. Comparing the heading angle of the vehicle traveling along each candidate route to a measured heading angle computed based on the motion data received from the vehicle may therefore be a key feature for evaluating the candidate routes and finding the best-fitting route with heading angle signatures in time and space as the that of the measured heading angle.

The heading angle of the vehicle may be therefore computed over time based on the motion data to create a measured heading angle time-series. Moreover, the heading angle of the vehicle may be simulated for each of the plurality of candidate routes over time to create a plurality of simulated heading angle time-series corresponding to the plurality of candidate routes.

The candidate routes may be ranked based on a match between their respective simulated heading angle time-series and the measured heading angle time-series. Moreover, a location of the vehicle may be thus derived and/or estimated based on the ranking, for example, according to an end location or a current location indicated in one or more highest ranking candidate routes.

The process 100 may be executed for one or more applications, goals and/or use cases. For example, the process 100 may be executed by a card theft application, system and/or platform to track stolen vehicles and/or vehicles suspected as stolen. In particular, the process 100 may be executed to track stolen vehicles which are unable to broadcast and/or transmit their geolocation due to jamming of their geolocation service signal, for example, a Global Navigation Satellite System (GNSS) signal and/or due to their geolocation sensor(s) being tampered and disabled as commonly done by car thieves.

Figure 2:
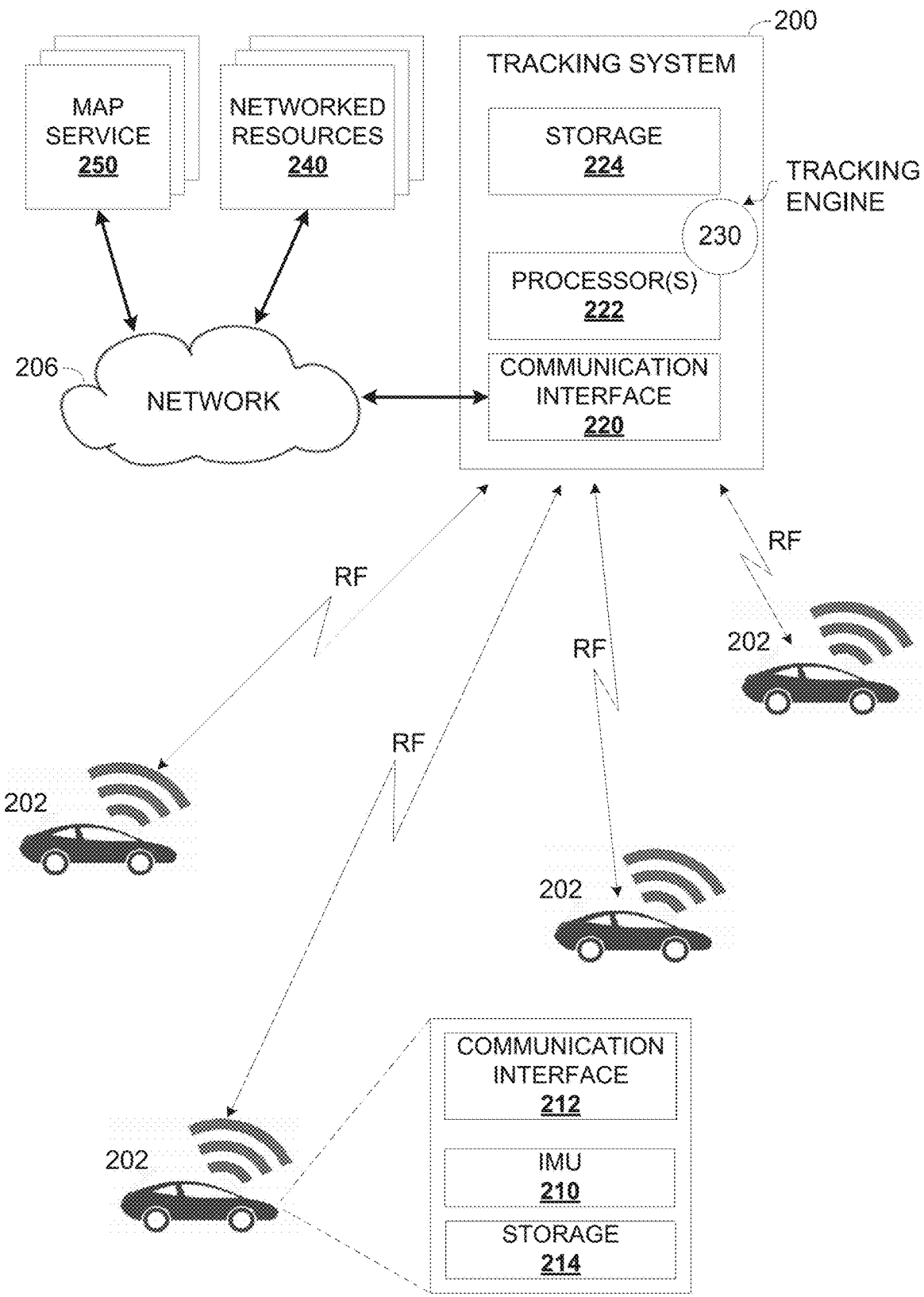
FIG. 2 is a schematic illustration of an exemplary system for tracking and estimating location of vehicles based on motion data captured by IMUs deployed in the vehicles, according to some embodiments of the present invention.

Reference is also made to FIG. 2, which is a schematic illustration of an exemplary system for tracking and estimating location of vehicles based on motion data captured by IMUs deployed in the vehicles, according to some embodiments of the present invention.

An exemplary tracking system 200 may be deployed to track a plurality of vehicles 202, in particular ground vehicles, for example, a car, a truck, a motorcycle, a bicycle, and/or the like based on motion data received from the vehicles via one or more Radio Frequency communication channels.

Each vehicle 202 may include one or more IMUs 210 configured to capture motion data relating to movement of the respective vehicle 202 and a communication interface 212 for transmitting the captured motion data to the tracking system 200. For brevity, all IMUs 210 deployed in each vehicle 202, whether one IMU 210 or multiple IMUs 210, are designated IMU 210 herein after.

The IMU 210 may include one or more sensors, for example, an accelerometer, a gyroscope, a magnetometer, a speedometer and/or the like configured to capture the motion data which may comprise at least acceleration and angular velocity data of the vehicle 202. However, depending on the sensors available to the IMU 210 and their functional capabilities, the captured motion data may further include speed of the vehicle 202, a heading, i.e., movement angle of the vehicle 202 and/or the like.

The IMU 210 may capture (measure) the motion data periodically every predefined time interval such that the motion data is captured at a plurality of points in time (time points) temporally spaced from each other by the predefined time interval, for example, 0.005 second, 0.01 second, 0.02 second, 0.05 second, and/or the like.

Figure 3:
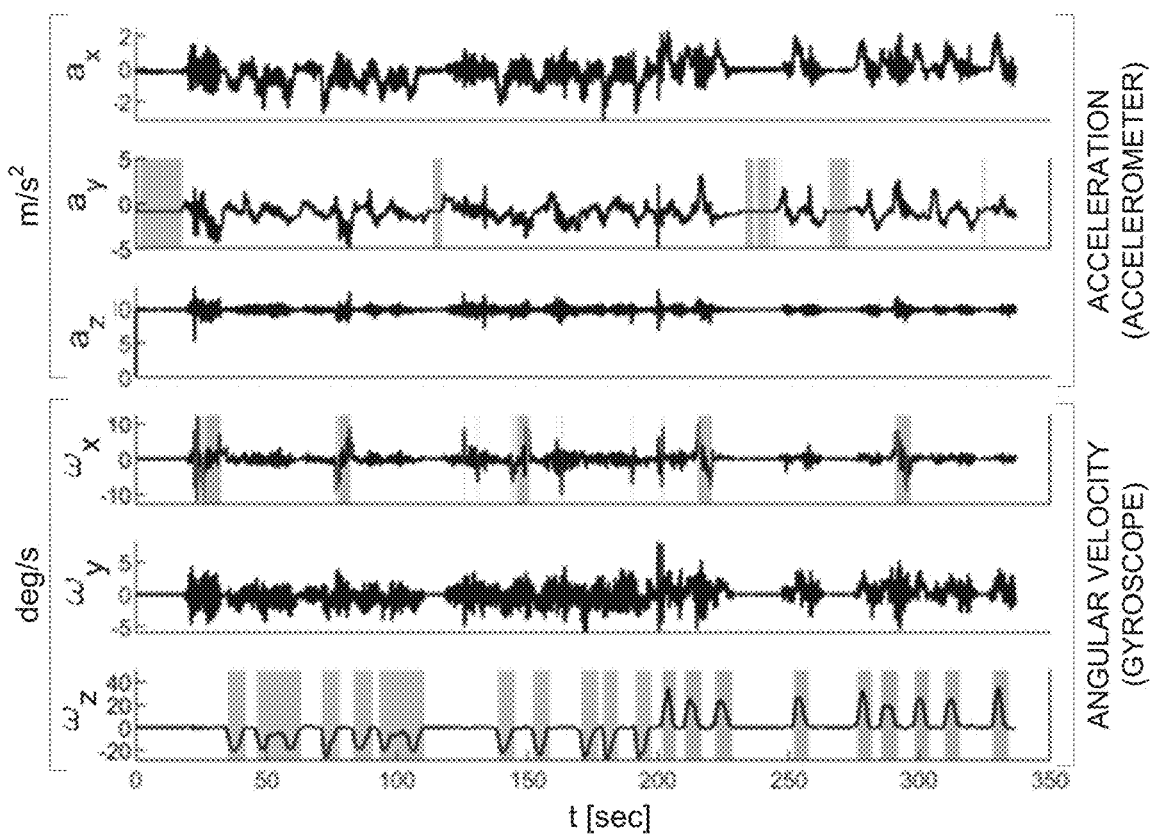
FIG. 3 illustrates graph charts of exemplary motion data used to track vehicles, according to some embodiments of the present invention.

Reference is now made to FIG. 3, which illustrates graph charts of exemplary motion data used to track vehicles, according to some embodiments of the present invention.

As seen in FIG. 3, motion data captured by an IMU such as the IMU 210 deployed in a vehicle such as the vehicle 202 may include at least acceleration data measured by one or more accelerometer sensors of the IMU 210 and angular velocity data measured by one or more gyroscope sensors of the IMU 210.

As seen, the IMU 210 may capture motion data periodically over time at predefined time intervals as expressed all graphs by the x axis (t[sec]). The acceleration of the vehicle 202 may be measured over time in three axes, as expressed by the y axis ($\alpha[m/sec^2]$) of the top three graphs presenting $\alpha_x$, $\alpha_y$, and $\alpha_z$. The angular velocity of the vehicle 202 may be also measured over time in three axes, as expressed by the y axis ($\omega[deg/sec]$) of the bottom three graphs presenting $\omega_x$, $\omega_y$, and $\omega_z$.

As known in the art, the measured motion data may be indicative of the movement of the vehicle 202. For example, the shaded areas in the y axis acceleration $\alpha_y$ expressing forward/backward movement of the vehicle 202 may indicate time periods when the vehicle 202 is stationary. In another example, the shaded areas in the x axis angular velocity $\omega_x$ expressing the pitch angle of the vehicle 202 may indicate the vehicle 202 ascends and/or descends at slopes in its path. In another example, the shaded areas in the z axis angular velocity $\omega_z$ expressing the yaw angle of the vehicle 202 may indicate turns of the vehicle 202.

Reference is made once again to FIG. 2.

Each IMU 210 may be calibrated according to frame of reference of the respective vehicle 202 in which it is deployed such that the respective IMU 210 may be aligned to a common coordinate system with the respective vehicle

202. The readings, i.e., the motion data captured by each IMU 210 may be therefore aligned with the respective vehicle 210 such that the local frame of the IMU 210 is known with respect to the frame of the vehicle 202. As such, when the vehicle moves in a certain direction, the certain direction is reflected in the motion data captured by the IMU 210.

The communication interface 212 may include one or more RF communication interfaces interface, for example, a cellular interface, a proprietary RF communication interface, and/or the like for communicating with one or more remote systems, devices and/or other resources, specifically with the tracking system 200.

One or more of the vehicles 202 may further comprise a storage 214 for storing, at least temporarily, at least part of the motion data captured by the IMU 210. The storage 214 may comprise one or more persistent non-volatile devices, for example, a ROM, a Flash array, a hard drive, an SSD, and/or the like as well as one or more volatile devices, for example, a RAM device, a cache memory and/or the like.

One or more of the vehicles 202 may comprise one or more processing devices, for example, a processor, a controller, and/or the like configured to execute software program instructions for collecting the motion data captured by the IMU(s) 210 and transmit it to the tracking system 200 via the communication interface 212. However, one or more of the vehicles 202 may employ one or more hardware elements, for example, a Field Programmable Gate Array (FPGA), an Application Specific Integrated Circuit (ASIC) and/or the like configured to collect and transmit the captured motion data. Moreover, collection and transmission of the motion data may be done by a combination of one or more hardware elements and one or more software programs. For brevity, the vehicles 202 are described to perform any action and/or operation conducted locally at each vehicle 202.

The tracking system 200, for example, a server, a computing node, a cluster of computing nodes and/or the like may include a communication interface 220, a processor(s) 222, and a storage 224 for storing data and/or code (program store).

Via the communication interface 220, the tracking system 200 may communicate with one or more of the vehicles 202 to receive the motion data relating to the respective vehicle 202 which is captured by the IMU(s) deployed in the respective vehicle 202.

The communication interface 220 may further include one or more network interfaces for connecting to a network 206 comprising one or more wired and/or wireless, for example, a Local Area Network (LAN), a Wireless Local Area Network (WLAN), a Wide Area Network (WAN), a Municipal Area Network (MAN), a cellular network, the internet and/or the like.

As such, one or more vehicles 202 having a communication interface 212 which supports wireless networking, for example, a cellular interface and/or the like may optionally communicate with the tracking system 200 via the network 206.

Via the network 206, the tracking system 200 may further communicate with one or more networked resources 240, for example, a server, a computing node, a cluster of computing nodes, a cloud service, and/or the like. In particular, the tracking system 200 may communicate with one or more map services to retrieve map data relating to one or more geographical areas.

The processor(s) 222, homogenous or heterogeneous, may include one or more processing nodes arranged for parallel processing, as clusters and/or as one or more multi core processor(s). The storage 224 may include one or more non-transitory memory devices, either persistent non-volatile devices, for example, a ROM, a Flash array, a hard drive, an SSD, and/or the like as well as one or more volatile devices, for example, a RAM device, a cache memory and/or the like. The storage 224 may further comprise one or more local and/or remote network storage resources, for example, a storage server, a Network Attached Storage (NAS), a network drive, a cloud storage service and/or the like accessible via the communication interface 220.

The processor(s) 222 may execute one or more software modules, for example, a process, a script, an application, an agent, a utility, a tool, an Operating System (OS), a service, a plug-in, an add-on and/or the like each comprising a plurality of program instructions stored in a non-transitory medium (program store) such as the storage 224 and executed by one or more processors such as the processor(s) 222.

Optionally, the processor(s) 222 includes, utilizes and/or applies one or more hardware elements available in the tracking system 200, for example, a circuit, a component, an Integrated Circuit (IC), an ASIC, an FPGA, a Digital Signals Processor (DSP), a Graphic Processing Unit (GPU) and/or the like.

The processor(s) 222 may therefore execute one or more functional modules utilized by one or more software modules, one or more of the hardware modules and/or a combination thereof. For example, the processor(s) 222 may execute a tracking engine 230 configured to execute the process 100.

Optionally, the tracking system 200 and/or the tracking engine 230 may be utilized by one or more cloud computing services, platforms and/or infrastructures such as, for example, Infrastructure as a Service (IaaS), Platform as a Service (PaaS), Software as a Service (SaaS) and/or the like provided by one or more vendors, for example, Google Cloud, Microsoft Azure, Amazon Web Service (AWS) and Elastic Compute Cloud (EC2), IBM Cloud, and/or the like.

For brevity, the process 100 is presented and described for tracking a single vehicle 202 based on motion data captured by one or more IMUs deployed in the vehicle 202. This, however, should not be construed as limiting since the process 100 may be repeated and expanded for tracking and estimating location of a plurality of vehicles 202 based on the motion data captured by the IMU(s) deployed in each of those vehicles 202.

As shown at 102, the process 100 starts with the tracking engine 230 receiving motion data captured by the IMU 210 deployed in one of the vehicles 202 while the vehicle 202 follows (rides, drives) a certain route. As described herein before, the tracking engine 230 may receive the motion data from the vehicle 202 via one or more of the RF communication channels, for example, via the cellular network.

In particular, the vehicle 202 may be unable to provide geolocation data which may prevent determining the geographical location of the vehicle 202 and track it accordingly. Vehicles 202, specifically, vehicles installed with anti-theft systems (devices) may typically comprise one or more geolocation sensors which may enable them to determine, with high precision, their location at any time based on one or more geolocation services, for example, GNSS such as, for example, GPS, GLONASS, China's BeiDou Navigation Satellite System, the European Union's Galileo and/or the like.

The vehicle 202 may be unable to provide the geolocation data due to one or more reasons. For example, vehicle 202 may be subject to theft and its GNSS signal may be jammed such that the geolocation sensor(s) deployed in the vehicle 202 may be unable to receive the GNSS signal. In another example, the geolocation sensor(s) deployed in the vehicle 202 may be tampered and disabled. Jamming the GNSS signal and/or disabling the geolocation sensor(s) deployed in the vehicle 202 may be done, for example, in a theft event of the vehicle 202 to prevent tracking of the stolen vehicle 202. In another example, the GNSS signal may be lost or unstable due to one or more weather and/or environment conditions, for example, rain, clouds, and/or the like. In another example, no geolocation sensors may be deployed in the vehicle 202.

However, while the geolocation of the vehicle 202 is currently unavailable, the initial location (staring point) of the vehicle 202 is known. In other words, the last location of the vehicles 202, prior to the time when the geolocation data is no longer available for the vehicle 202, is known. For example, assuming the vehicle is installed with an anti-theft system which may transmit its geolocation periodically, on demand and/or or in response to one or more events, for example, when parked, when detecting potential theft event and/or the like.

In another example, the initial location of the vehicle 202 may be identified, computed and/or otherwise determined based on imagery data captured by one or more imaging sensors, for example, a camera, a video camera and/or the like whose geolocation is known. Specifically, the imagery data is time-stamped such that timing of presence of the vehicle 202 at the initial location is also known. For example, assuming the vehicle 202 is parked at a certain area monitored by a security camera. Based on analysis of the images depicting the vehicle 202 at the certain area, the initial location and its timing may be determined. In another example, the initial location of the vehicle 202 may be determined based on imagery data captured by one or more traffic cameras which the vehicle 202 crossed where the location and timing of the captured imagery is known.

Moreover, while the GNSS signal may be jammed or unavailable, the RF communication signal may be available at least intermittently such that the vehicle 202 may transmit the motion data captured by the IMU 210 to the tracking system 200, specifically to the tracking engine 230 via the RF communication channel(s).

While the RF communication channel(s) is not available and the vehicle 202 is unable to transmit the motion data to the tracking system, the motion data captured by the IMU 210 may be stored locally in the vehicle 202, for example, in the storage 214. When the RF communication channel(s) becomes available again and communication with the tracking system 200 is resumed, the vehicle 202 may transmit the stored motion data to the tracking engine 230.

Figure 4:
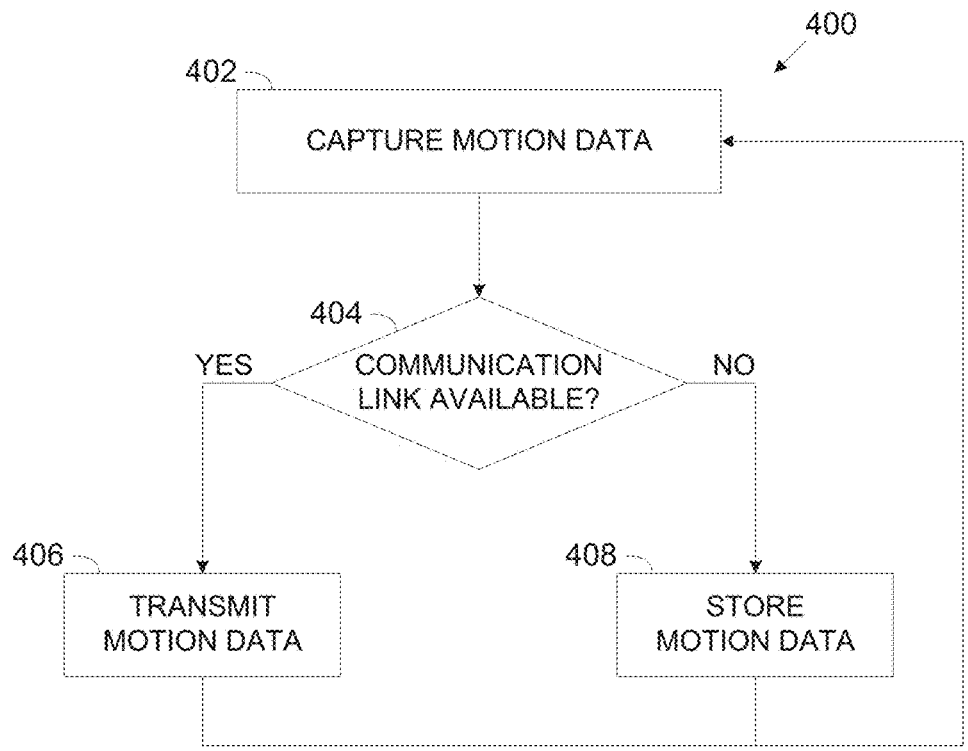
FIG. 4 is a flowchart of an exemplary process of collecting and transmitting, at a vehicle, motion data captured by an IMU deployed in the vehicle, according to some embodiments of the present invention.

Reference is now made to FIG. 4, which is a flowchart of an exemplary process of collecting and transmitting, at a vehicle, motion data captured by an IMU deployed in the vehicle, according to some embodiments of the present invention.

An exemplary process 400 may be executed by one or more vehicles such as the vehicle 202 configured to capture motion data relating to the respective vehicle 202 and transmit the captured motion data to a tracking system such as the tracking system 200.

As shown at 402, the vehicle 202 may collect motion data captured by one or more IMUs such as the IMU 210 deployed in the vehicle 202.

As shown at 404, which is a conditional step, in case the RF communication channel(s) is available and the vehicle 202 may communicate with the tracking system 200, the process 400 branches to 406. However, in case RF communication channel(s) is unavailable (down) and the vehicle 202 is unable to communicate with the tracking system 200, the process 400 may branch to 408.

As shown at 406, since the RF communication channel(s) is available, the vehicle 202 may transmit the captured motion data to the tracking system 200.

As shown at 408, since the RF communication channel(s) is not available, the vehicle 202 may locally store the captured motion data, for example, in a storage such as the storage 214.

As seen, the process 400 may continuously repeat and branch to 402 to handle new motion data captured by the IMU 210.

During the continuously repeated process 400, whenever the RF communication channel(s) becomes available and the vehicle 202 resumes communication with the tracking system 200, the vehicle 202 may transmit all motion data collected and stored since the last communication with the tracking system 200. As such, the vehicle 202 provides the tracking system 200 with motion data captured during the entire time including the times when the RF communication channel(s) was unavailable.

Moreover, the vehicle 202 may transmit the captured motion data and/or part thereof to the tracking system 200, via the RF communication channel(s), in a plurality of data segments (chunks). The tracking system 200, specifically the tracking engine 230 receiving the plurality of segments may combine the plurality of segments to restore the motion data relating to the vehicle 202.

This means that while the RF communication channel(s) is available and the vehicle 202 may communicate with the tracking system 200, the vehicle 202 may transmit the motion data continuously, i.e., whenever motion data captured by the IMU 210 at a certain time point is available, the vehicle 202 may transmit the captured motion data to the tracking engine 230. However, the vehicle 202 may optionally accumulate motion data captured by the IMU 210 at several time points, organize (pack) the motion data in one or more segments and transmit the segments the tracking engine 230. Moreover, the vehicle may divide the motion data captured by the IMU 210 at a single time point to a plurality of segments and transmit the segments to the tracking engine 230.

For example, assuming the motion data captured by the IMU 210 at one or more points in time comprises 1 KB of data, the vehicle may transmit the motion data to the tracking system 200 in several segments, for example, 4 segments each comprising 256 bytes. The tracking engine 230 receiving the 4 segments may combine them to restore the motion data captured for vehicle at the certain time.

Reference is made once again to FIG. 1.

As shown at 104, the tracking engine 230 may accumulate the motion data received from the vehicle 202 over a certain time period to form a motion dataset that may be sufficient for simulating a substantial portion and/part of the path of the vehicle 202 in order to track the vehicle 202. The time period during which the tracking engine 230 accumulates the motion data captured by the IMU 210 of the vehicle 202 may be, for example, 5 minutes, 10 minutes, 15 minutes and/or the like. In another example, the tracking engine 230 may accumulate the motion data for the entire trip of the vehicle 202, i.e., until the vehicle 202 comes to a complete stop for a certain time period, for example, 2, 5, 10, 15 minutes and/or the where it is assumed that the vehicle 202 is parked.

As shown at 106, the tracking engine 230 may compute a measured heading angle time-series of the vehicle 202 based on the motion data received from the vehicle 202.

The measured heading angle time-series is constructed of a plurality of heading (direction) angle values computed by the tracking engine 230 for the vehicle 202 at a plurality of time points, typically the time points corresponding to the time points of motion data as measured by the IMU 210 of the vehicle 202 and may thus express a direction of movement of the vehicle 202 over time.

The tracking engine 230 may compute the measured heading angle time-series $\psi^{true}$ by calculating estimated roll, pitch, and yaw angles of the vehicle 202 during the drive (trip) of the vehicle 202 based on the motion data received from the vehicle 202, specifically based on the acceleration and angular velocity data.

In particular, the tracking engine 230 may compute the measured heading angle time-series $\psi^{true}$ based on a heading angle value $\psi_i^{true}$ computed at each of the plurality of time points based on the yaw value measured at the respective time point $t_i$ of a plurality of N time points of a total travel time T during which the motion data is captured (recording time).

The heading angle (values) $\psi_i^{true}$ may be in a range of 0 to 360 degrees (or 2 pi in radians) covering all possible yaw values where 0 degrees may represent the true north, 90 degrees may represent west, 180 degrees may represent south and 270 degrees may represent east. Alternatively, the heading angle (values) may be corrected to be in a range of −180 to 180 degrees where 0 degrees may represent the true north, 90 degrees may represent west, −90 may represent east and −180/180 degrees may represent south.

The measured heading angle time-series $\psi^{true}$ computed by the tracking engine 230 may therefore express the time period during which the vehicle 202 travels (rides) along a certain route with a plurality of heading angle values $\psi_i^{true}$ computed at the plurality of time points i.

Optionally, the tracking engine 230 may pre-process the motion data prior to using it to calculate the estimated roll, pitch, and yaw angles of the vehicle 202. For example, the tracking engine 230 may apply one or more de-noising algorithms, one or more filters such as, for example, a low-pass filter, and/or the like.

The tracking engine 230 may use one or more estimation algorithms known in the art to calculate the estimated roll, pitch, and yaw angles of the vehicle 202, for example, a Kalman Filter-based algorithm, or one or more such algorithms known in the art as Attitude and Heading Reference System (AHRS).

The heading angle of the vehicle 202 computed by the tracking engine 230 at each time point may be referenced to the true geographic north which is the common reference for map data such as, for example, physical maps, road network maps, orthophotos and/or the like.

Since the motion data received from the vehicle 202 may include only acceleration and angular velocity data, the initial heading angle of the vehicle 202 may be unknown. In such case, the heading angle time-series computed by the tracking engine 230 may comprise only a relative yaw over time rather than the actual true direction of the vehicle 202 with respect to the true north. The unknown initial heading angle may be treated as another variable in the tracking algorithm as described herein after.

Optionally, the motion data comprises heading data expressing a heading of the vehicle 202 with respect to a reference direction, for example, the magnetic north identified as the magnetic north polar. Such heading data may be measured by one or more magnetometer sensors deployed in the vehicle 202 and collected by the IMU 210 of the vehicle 210.

As known in the art, the magnetic north may deviate from the true (geographic) north. This deviation may be insignificant with respect to performance of the vehicle tracking algorithm and the magnetic north may be assumed to be identical to the true north. However, optionally, one or more extensions, corrections and/or adjustments may be applied to align the heading angle values computed for the vehicle 202 with the true north. Since the deviation between the magnetic north and the true north may be geographical area dependent, the extensions, corrections and/or adjustments may be applied accordingly depending on the geographic area of the vehicle 202.

In such case, an initial heading angle $\psi_0$ of the vehicle 202 may be extracted from the motion data and the heading angle time-series computed by the tracking engine 230 may comprise the actual heading (movement direction) of the vehicle 202 over time. Using the heading data measured by the IMU 210 may therefore simplify tracking of the vehicle 202 by the tracking engine 230 since the true heading angle (up to a constant offset) of the vehicle 202 may be accurately computed.

The heading angle value $\psi_i^{true}$ computed by the tracking engine 230, which depends on the initial heading angle $\psi_0$ of the vehicle 202 at time $t_0$ when the vehicle 202 is located at the initial location, may be therefore expressed by equation 1 below:

$$\psi_i^{true} = \psi_0 + \psi_i^{yaw} \qquad \text{Equation 1}$$

As stated herein before, in case the initial heading angle $\psi_0$ is unknown, it becomes part of the route search optimization problem described herein after.

Figure 5:
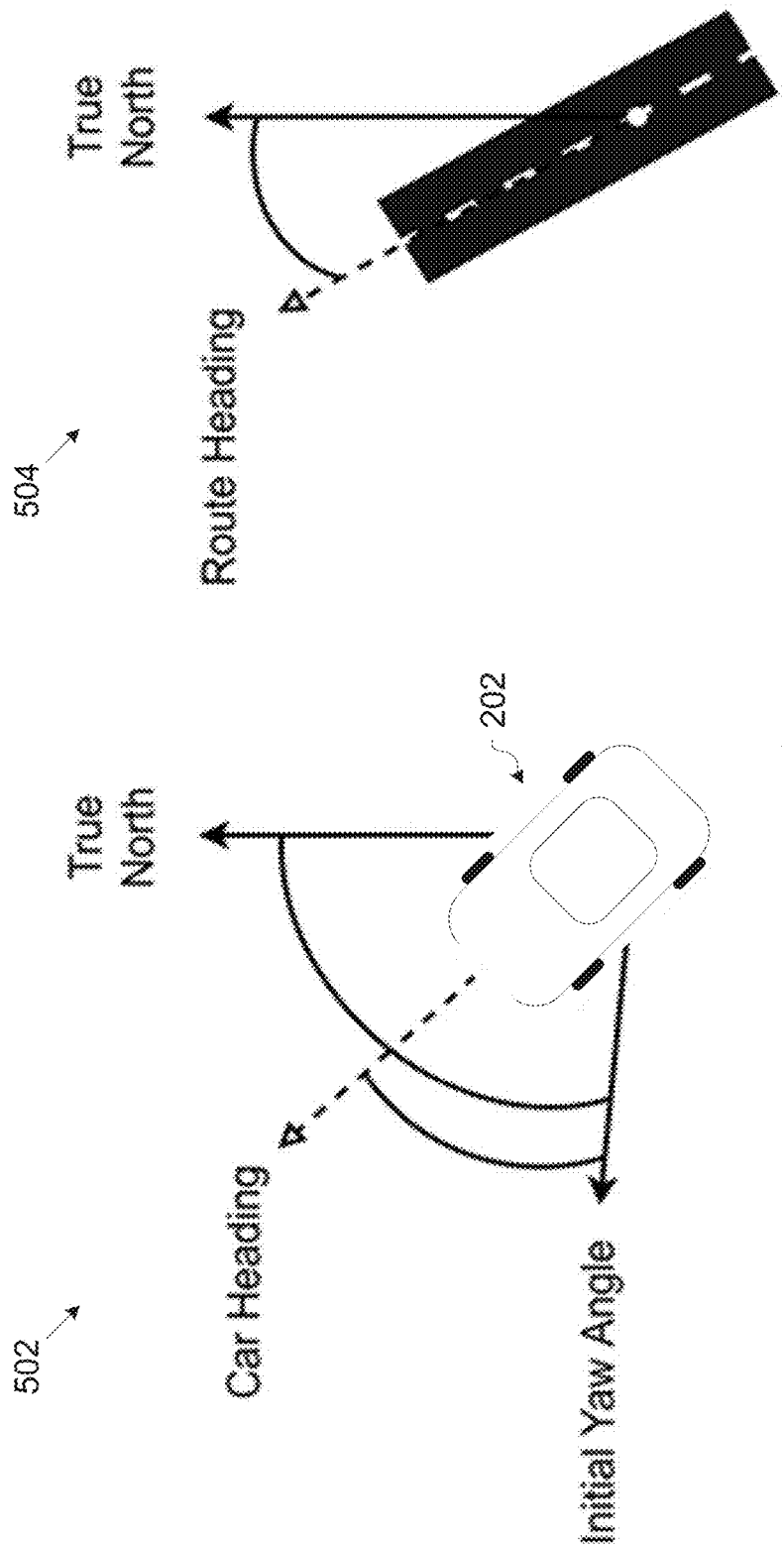
FIG. 5 is a schematic illustration of referencing a heading angle of a vehicle to an initial yaw vs. reference to the true north for tracking and estimating location of vehicles based on motion data captured by IMUs, according to some embodiments of the present invention.

Reference is now made to FIG. 5, which is a schematic illustration of referencing a heading angle of a vehicle to an initial yaw vs. reference to the true north for tracking and estimating location of vehicles based on motion data captured by IMUs, according to some embodiments of the present invention.

As seen in illustration 502, a tracking engine such as the tracking engine 230 may compute the heading angle of a vehicle such as the vehicle 202 with respect to an initial yaw in case the motion data received from the vehicle 202 does not include heading data which may be used to compute the initial heading angle of the vehicle 202.

However, as seen in illustration 504, in case the motion data received from the vehicle 202 includes heading data, the tracking engine 230 may compute the heading angle of the vehicle 202 with respect to the true north since, as described herein before, the magnetic north is assumed to align with the true north and/or the heading data is adjusted to align with the true north.

Reference is made once again to FIG. 1.

As shown at 108, the tracking engine 230 may obtain map data of an area surrounding the initial location of the vehicle 202.

The map data may include one or more of a plurality of map types expressing a map information relating to potential routes the vehicle 202 may travel. The map data may include, for example, one or more physical maps showing geographical features such as, for example, terrain, mountains, soil type and/or the like as well as infrastructures such as, for example, roads, railroads, buildings, and/or the like. In another example, the map data may include road network data illustrated by one or more road network maps. In another example, the map data may include imagery data, for example, one or more aerial orthophoto, one or more ground level pictures, and/or the like.

In particular, the map data may be available in digital format such that the tracking engine 230 may analyze it to identify the potential routes.

The tracking engine 230 may obtain the map data from one or more resources. For example, the tracking engine 230 may retrieve the map data or part thereof from one or more records (e.g. map, imagery data, etc.) locally stored at the tracking system 200, for example, in the storage 224. In another example, the tracking engine 230 may communicate with one or more of the map services 250, for example, OpenStreetMap (OSM), Google maps, Google street view, Google earth, Apple maps, Bing maps, MapQuest, Waze, and/or the like to receive at least some of the map data relating to the area surrounding the initial location of the vehicle 202.

Reference is now made to FIG. 6, which presents schematic illustrations of exemplary map data used for tracking and estimating location of vehicles based on motion data captured by IMUs deployed in the vehicles, according to some embodiments of the present invention.

As seen, an exemplary urban map 602, an exemplary orthophoto 604 and an exemplary road network map 606 may present an area surrounding an initial location 600 of a vehicle such as the vehicle 202.

Reference is made once again to FIG. 1.

As shown at 110, the tracking engine 230 may analyze the map data to identify a plurality of candidate routes the vehicle 202 may follow (travel) starting at the initial location.

Reference is now made to FIG. 7A and FIG. 7B, which are schematic illustration of candidate routes of a vehicle from an initial known location identified by analyzing map data, according to some embodiments of the present invention.

A tracking engine such as the tracking engine 230 analyzing the map data, for example, the road network map 606 may identify a plurality of candidate routes 700. For example, the tracking engine 230 may identify a first candidate route 700A which starts at the initial location 600 and ends at an end location 710A which is the same as the initial location 600. In another example, the tracking engine 230 may identify a second candidate route 700B which starts at the initial location 600 and ends at an end location 710B. In another example, the tracking engine 230 may identify a second candidate route 700C which starts at the initial location 600 and ends at an end location 710C. In another example, the tracking engine 230 may identify a second candidate route 700D which starts at the initial location 600 and ends at an end location 710D.

Reference is made once again to FIG. 1.

As shown at 112, the tracking engine 230 may simulate (compute) a plurality of simulated heading angle time-series $\psi^{candidate}$ for the plurality (K) of candidate based on the map data such that a simulated heading angle time-series and $\psi^{candidate_k}$ is simulated for a respective one (k) of the plurality of candidate routes (K) (k=1, ..., K).

The tracking engine 230 may simulate the simulated heading angle time-series $\psi^{candidate_k}$ for each candidate route k by simulating the heading angle (value) of a simulated vehicle at each of a plurality of location points along the respective candidate route k. This means that each candidate route k is constructed of a respective plurality of location points distributed along the respective candidate route k. Moreover, the plurality of location points may correspond to the plurality of plurality of time points $t_i$ of the total travel time T at which the heading angles of the measured heading angle time-series $\psi^{true}$ are computed.

In particular, for each candidate route, the tracking engine 230 may simulate, i.e., compute estimate and/or otherwise determine the heading angle of the vehicle 202 at one or more of the location points according to geometry of the road at each of the location points determined based on analysis of the map data since the road geometry may expresses the direction of movement of the simulated vehicle at that location point.

Applying the road geometry to determine the simulated heading angle of the vehicle 202 at one or more of the location points may be seen, for example, in illustration 504 which visualizes how a road segment extracted from the map data may relate to the simulated heading angle.

As described herein before, the heading angle (values) of each simulated heading angle time-series $\psi^{candidate_k}$ are in the range of −180 to 180 degrees where 0 degrees may represent the true north, 90 degrees may represent west, −90 may represent east and −180/180 degrees may represent south.

The tracking engine 230 may then aggregate the plurality of heading angle values computed at the plurality of location points included in each candidate route k to generate the simulated heading angle time-series $\psi^{candidate_k}$ for the respective candidate route k. The simulated heading angle time-series $\psi^{candidate_k}$ may therefore express a time period during which the vehicle 202 is simulated to travel along the respective candidate route k with a plurality of heading angle values simulated at a plurality of location points along the respective candidate route k corresponding to the plurality of time points used to compute the measured heading angle time-series $\psi^{true}$.

For example, the tracking engine 230 may create a list of coordinates $(x_i, y_i)$ representing each location point $X_i$ of the plurality of location points N (i=1, ..., N) of the respective candidate route k which correspond to the plurality of N time points $t_i$ during total travel time T during which the simulated vehicle 202 travels the entire respective candidate route k such that each location point $X_i$ simulated at time $t_i$ may be defined by respective coordinates $X_i=(x_i, y_3)$.

Using the coordinates of the location points, the tracking engine 230 may compute a difference between every two consecutive location points $X_i$ and $X_{i+1}$ according to equation 2 below.

$$(dx_i, dy_i) = \frac{(x_{i+1} - x_i, y_{i+1} - y_i)}{|(x_{i+1} - x_i, y_{i+1} - y_i)|} \quad \text{Equation 2}$$

The tracking engine 230 may then compute the heading angle $\psi_i^{candidate_k}$ at each location point i based on a unit vector extending between the two subsequent location points $X_i$ and $X_{i+1}$ of the respective candidate route k, for example, according to equation 3 below.

$$\psi_i^{candidate_k} = \arctan 2(-dx_i, dy_i) \quad \text{Equation 3}$$

As shown at 114, the tracking engine 230 may optimize a match between the simulated heading angle time-series $\psi^{candidate}$ of each of the plurality of candidate routes and the measured heading angle time-series $\psi^{true}$.

The tracking engine 230 may compute the match (score) using one or more scoring or cost functions, algorithms, methods and/or techniques as known in the art. For example, the tracking engine 230 may apply an exemplary cost function expressed in equation 4 below to compute a match score, specifically a difference $J_k$ (serving as the match score) between the values of the heading angle $\psi_i^{candidate_k}$ of the simulated heading angle time-series $\psi^{candidate_k}$ computed for each candidate route k and corresponding heading angles $\psi_i^{true}$ of the measured heading angle time-series $\psi^{true}$ across the plurality of time points $t_i \in T$ (i=1, ..., N) which, as described herein before, correspond to the plurality of location points $X_i$ (i=1, ..., N).

$$J_k = \frac{\sum_{i=1}^{N} d\psi_i dt_i}{T} \qquad \text{Equation 4}$$

Where the heading angle difference $d\psi_i$ at time point (step) $t_i$ is the difference between the heading angle $\psi_i^{true}$ of the measured angle heading time-series $\psi^{true}$ and the corresponding heading angle $\psi_i^{candidate_k}$ of the simulated angle heading time-series $\psi^{candidate_k}$ of each candidate route k as expressed in equation 5 below.

$$d\psi_i = |\psi_i^{true} - \psi_i^{candidate_k}| \qquad \text{Equation 5}$$

As evident from equation 5, the tracking engine 230 may evaluate the match between the respective candidate route k to the actual route traveled by the vehicle 202 based on computing the difference between the heading values at all the time points $t_i$. However, since the heading angles $\psi_i^{true}$ are periodic with a period of 360 degrees (or 2 pi), a correction must be made when calculating the difference between two angles. The tracking engine 230 may therefore correct the heading angle difference $d\psi_i$ according to equation 6 below.

if $d\psi_i > 180 \rightarrow d\psi_i = d\psi_i - 360$ if $d\psi_i < -180 \rightarrow d\psi_i = d\psi_i + 360$      Equation 6

Optionally, in case the motion data comprises velocity data expressing a velocity of the vehicle 202 as measured by one or more velocity sensors deployed in the vehicle 202 and transmitted to the tracking system 200, the tracking engine 230 may adjust the predefined speed according to the actual speed of the vehicle 202.

As described herein before, the motion data may not include heading data expressing an absolute heading angle of the vehicle 202 with respect to a known direction, for example, with respect to the true north. The initial heading angle $\psi_0$ of the vehicle 202 at the initial location may be therefore unknown and the heading angles $\psi_i^{true}$ may be expressed by $\psi_i^{yaw}$ according to equation 1 with the initial heading angle $\psi_0$ being unknown. In such case, the minimized difference $J_k$ computed by the tracking engine 230 for the simulated angle heading time-series $\psi^{candidate_k}$ of each candidate route k may express a constant offset reflecting the offset between the initial heading angle $\psi_0$ assumed for the respective simulated heading angle time-series $\psi^{candidate_k}$ and the actual heading angle of the measured heading angle time-series $\psi^{true}$.

Optionally, the tracking engine 230 selects one or more estimated initial heading angles for the simulated angle heading time-series $\psi^{candidate_k}$ of one or more of the candidate routes according to road geometry at the known initial location of the vehicle 202. Since the vehicle 202 is assumed to ride on roads, the tracking engine 230 may assume that at least some of the candidate routes may start with a heading angle aligned with the road of the initial location. The tracking engine 230 may identify the road geometry based on analysis of the map data at the initial location. For example, assuming the tracking engine 230 identifies a north-south road at the initial location of the vehicle 202. In such case the tracking engine 230 may select two estimated initial heading angles, a first northbound estimated initial heading angle $\psi_0$ and a second southbound estimated initial heading angle.

The tracking engine 230 may then use the estimated initial heading angle(s) to minimize the difference $J_k$ for one or more of the candidate routes and evaluate the match between their simulated heading angle time-series $\psi^{candidate}$ and the measured heading angle time-series $\psi^{true}$.

However, while it may use the road geometry to estimate the initial heading angle for one or more of the candidate routes, the tracking engine 230 may not fully rely on this assumption, since the position of the vehicle 202 at the initial location may not be aligned with the road. For example, the vehicle 202 may be parked perpendicularly to the road at the initial location. In another example, the vehicle 202 may be parked in a certain angle in a parking bay in the road at the initial location. In such cases, the tracking engine 230 may revert to minimize the difference $J_k$ to the constant offset expressing and/or indicative of the initial heading angle $\psi_0$.

Moreover, in case the initial heading angle $\psi_0$ is unknown, the tracking engine 230 may identify and/or select a plurality of candidate routes each advancing towards a different direction according to the road geometry at the initial location of the vehicle 202. To continue the previous example, assuming a north-south road is identified at the initial location of the vehicle 202, the tracking engine 230 may select two candidate routes, a first candidate route moving north and a second candidate route moving to the south.

The difference $J_k$ computed for the simulated heading angle time-series $\psi^{candidate}$ of each of the candidate routes depends on the location (coordinates) of the plurality of location points forming the respective candidate route. The distribution of the location points $X_i$ (i=1, ..., N) of each candidate route which correspond to the time points $t_i \in T$ (i=1, ..., N) may reflect a speed (velocity) of movement of the simulated vehicle between the location points of the respective candidate route. Since the speed of the simulate vehicle may differ compared to the speed of the vehicle 202, the tracking engine 230 may attempt to minimize the difference $J_k$ computed for one or more of the candidate routes by adjusting the distribution of the location points of one or more of the candidate routes which may reflect different speeds of the simulated vehicle travelling between location points along the respective candidate route.

The initial distribution of the location points of each of the candidate routes may be set according to one more methodologies. For example, the plurality of location points may be uniformly distributed along one or more of the candidate routes such that the plurality of location points are equally spaced. Moreover, since the distribution of the location points may reflect speed of the simulated vehicle, the location points may be distributed along one or more of the candidate routes according to one or more attributes, parameters and/or characteristics of the roads traversed in the respective candidate route which may affect the speed of vehicles riding these roads. For example, assuming a certain candidate road includes a segment of high speed road, for example, a freeway, in which vehicles may drive significantly fast, location points may be distributed along the high speed road segment with increased spaces reflecting higher speed of the simulated vehicle. In another example, assuming a certain candidate road includes a segment of low speed road, for example, a winding uphill road, in which vehicles must drive significantly slow, location points may be distributed along the low speed road segment with reduced spaces reflecting lower speed of the simulated vehicle.

The tracking engine 230 may adjust the location of one or more of the plurality of location points of the respective candidate route such that the distribution of the plurality of location points along the respective candidate route is modified (adjusted). Adjusting the location (distribution) of the location points along the respective candidate route may affect the heading angle at these location points according to different road geometry at the adjusted location points compared to the previous location points and may better match the actual location points of the vehicle 202 as reflected in the heading angles of the measured heading angle time-series.

Optionally, the tracking engine 230 may apply one or more speed limits, for example, a maximal speed, a minimal speed and/or the like of the simulated vehicle which may dictate the distribution of location points along one or more of the candidate routes in correspondence to the plurality of time points. For example, the tracking engine 230 may apply a certain speed range, for example, 50-150 km/h for redistributing the location points along one or more of the candidate routes.

The tracking engine 230 may then simulate an adjusted simulated heading angle time-series $\psi^{candidate}$ for the respective candidate route with the adjusted distribution of location points and compute a new match score for the adjusted simulated heading angle time-series $\psi^{candidate}$, for example, according to question 4.

The tracking engine 230 may repeat the adjustment of the location points distribution of one or more of the candidate routes and compute their match score accordingly in attempt to minimize the difference $J_k$ of the respective candidate route and select the optimal, for example, minimal difference $J_{k_{min}}$ as expressed in equation 7 below.

$$J_{k_{min}} = \min_{\{X_i: i=1,2,\ldots,N\}} \frac{\sum_{i=1}^{N} d\psi_i dt_i}{T} \quad \text{Equation 7}$$

The tracking engine 230 may apply one or more optimization methods, algorithms and/or functions as known in the art, for example, gradient descent, Nelder-Mead, and/or the like in order to optimize the match, for example, minimize the difference $J_{k_{min}}$.

As shown at 116, the tracking engine 230 may rank the plurality of simulated heading angle time-series $\psi^{candidate_k}$ (k∈K) based on the match (score), for example the minimized difference $J_{k_{min}}$ between the simulated heading angle time-series $\psi^{candidate_k}$ of each of the candidate routes k and the measured heading angle time-series $\psi^{true}$.

The tracking engine 230 may further create an ordered list of a predefined number (e.g., 2, 3, 5, etc.) of candidate routes based on the ranking candidate routes expressing a probability that vehicle 202 actually traveled (followed) the listed candidate routes. The tracking engine 230 may also assign a probability score (weight) to each of the listed candidate routes, for example, based on the value of the difference $J_{k_{min}}$ computed for each of the multiple highest ranking candidate routes. For example, a certain candidate route having a lowest minimized difference $J_{k_{min}}$ may be ranked first (top) in the list of candidate routes which potentially match the route actually traveled (followed) by the vehicle 202.

Reference is now made to FIG. 8A and FIG. 8B, which are graph charts illustrating matching between simulated angle heading time-series simulated for candidate routes of a vehicle and a measured angle heading time-series of the vehicle computed according to motion data captured by an IMU deployed in the vehicle, according to some embodiments of the present invention.

Graph charts 800A, 800B, 800C and 800D may visualize the matching made by a tracking engine such as the tracking engine 230 between a plurality of simulated heading angle time-series $\psi^{candidate}$ computed for each of a plurality of candidate routes estimated for an exemplary vehicle such as the vehicle 202, in particular, candidate routes 700A, 700B, 700C and 700D respectively and an exemplary measured heading angle time-series $\psi^{true}$ 202 based on motion data received from the vehicle 202 which is captured by the IMU(s) 210 deployed in the vehicle 202.

As may be seen in all graph charts 800, the simulated heading angle time-series $\psi^{candidate}$ computed for the candidate routes 700A, 700B, 700C and 700D may sometimes alternate (oscillate) between −180 and 180 (both representing south bound movement) due to the periodic (cyclic) nature of the heading angle. The tracking engine 230 however, may apply one or more algorithms to compensate for the alternations and thus remove and/or at least reduce the noise induced by the alternating heading angle.

Graph 800A presents the match between the simulated heading angle time-series $\psi^{candidate}$ (designated candidate route in the chart) simulated by the tracking engine 230 for the candidate route 700A and the measured heading angle time-series $\psi^{true}$ (designated true route in the chart) computed for the vehicle 202 by the tracking engine 230 based on the motion data received from the vehicle 202. As evident from visual inspection, the match is significantly high. This observation may be further corroborated by a minimized difference $J_1$=8.229 where $J_1$ refers to $J_{1_{min}}$ computed by the tracking engine 230 for candidate route 700A according to equation 7.

Graph 800B presents the match between the simulated heading angle time-series $\psi^{candidate}$ (designated candidate route in the chart) simulated by the tracking engine 230 for the candidate route 700B and the measured heading angle time-series $\psi^{true}$ (designated true route in the chart) computed for the vehicle 202. As evident from visual inspection, while the simulated heading angle time-series $\psi^{candidate}$ may highly match the measured heading angle time-series $\psi^{true}$ for most of the candidate route 700B, the final portion of the simulated heading angle time-series $\psi^{candidate}$ may significantly diverge from the measured heading angle time-series $\psi^{true}$. This may be expressed by a minimized difference $J_2$=22.91 where $J_2$ refers to $J_{2_{min}}$ computed by the tracking engine 230 for candidate route 700B according to equation 7.

Graph 800C presents the match between the simulated heading angle time-series $\psi^{candidate}$ (designated candidate route in the chart) simulated by the tracking engine 230 for the candidate route 700C and the measured heading angle time-series $\psi^{true}$ (designated true route in the chart) computed for the vehicle 202. As evident from visual inspection, the simulated heading angle time-series $\psi^{candidate}$ may match the measured heading angle time-series $\psi^{true}$ the candidate route 700B and may then significantly diverge. This may be expressed by a minimized difference $J_3$=52.06 here $J_3$ refers to $J_{3_{min}}$ computed by the tracking engine 230 for candidate route 700C according to equation 7.

Graph 800D presents the match between the simulated heading angle time-series $\psi^{true}$ (designated candidate route in the chart) simulated by the tracking engine 230 for the candidate route 700D and the measured heading angle time-series $\psi^{true}$ (designated true route in the chart) computed for the vehicle 202. As evident from visual inspection, the simulated heading angle time-series $\psi^{candidate}$ shows very little match with the measured heading angle time-series $\psi^{true}$. This may be expressed by a minimized difference $J_4$=95.18 here $J_4$ refers to $J_{4_{min}}$ computed by the tracking engine 230 for candidate route 700D according to equation 7.

For this exemplary use case, based on their computed difference $J_k$, the tracking engine 230 may therefore rank the candidate routes as follows from highest to lowest: (1) candidate route 700A, (2) candidate route 700B, (3) candidate route 700C, and (4) candidate route 700D.

Reference is made once again to FIG. 1.

Optionally, the tracking engine 230 discards (eliminates, drops) one or more of the candidate routes having simulated heading angle time-series $\psi^{candidate}$ which are unrealistic, do not comply and/or significantly deviate from the measured heading angle time-series $\psi^{true}$.

For example, the tracking engine 230 may discard one or more of the candidate routes which express an unrealistic velocity of the vehicle 202 that exceeds typical maximal velocity of vehicles 202 in general and optionally of the vehicle 202 in particular. The tracking engine 230 may compute and/or estimate the unrealistic velocity based on a length of one or more segments of the candidate route(s) traveled by the simulated vehicle 202 in a certain time period. The tracking engine 230 may compute and/or estimate the length of each segment based on the map data, for example, start and end geolocation coordinates of the segment. The tracking engine 230 may determine that it may be unrealistic for the vehicle 202 to travel this segment within the time indicated in the simulated heading angle time-series $\psi^{candidate}$ one or more of the candidate route, i.e., the speed may be too high or too slow, and may thus discard this candidate route(s).

In another example, the tracking engine 230 may discard one or more of the candidate routes which do not cross one or more geographical locations identified for the vehicle 202. The tracking engine 230 may identify this geographical location(s) based on geolocation data received from the vehicle 202 which is captured by one or more of the geolocation sensors deployed in the vehicle 202. For example, assuming that despite the jamming and/or tampering, the geolocation sensor(s) deployed in the vehicle 202 receives the GNSS signal, the vehicle 202 may compute its geolocation at one or more times and transmit it to the tracking system 200. The tracking engine 230 may analyze the candidate routes and discard one or more the candidate routes which do not cross the geolocation(s) reported by the vehicle 202.

Moreover, the tracking engine 230 may discard one or more of the candidate routes which do not cross the geographical location(s) identified for the vehicle 202 at the time reported by the vehicle 202. This means that while such candidate rotes may cross the geographical location(s) reported by the vehicle 202, the time of crossing the reported geographical location(s) may deviate by more than a certain threshold from the time reported by the vehicle 202. The tracking engine 230 may determine the time of crossing the reported geolocation(s) based on analysis of the simulated heading angle time-series $\psi^{candidate}$ of the respective candidate route(s). The threshold value may be set according to one or more parameters, for example, terrain type (e.g. highway, urban area, etc.), traffic and/or the like. For example, the threshold may be set to one minute for high speed routes, for example, a freeway. Assuming a certain simulated candidate route crosses a certain geolocation, reported by the vehicle 202, one and a half minutes after the crossing time reported by the vehicle 202. In such case, the tracking engine 230 may determine that the certain candidate route may not be a valid candidate route and may discard it. In another example, the threshold may be set to five minutes for slower routes, for example, urban area. Assuming a certain simulated candidate route crosses a certain geolocation reported by the vehicle 202 six minutes after the crossing time reported by the vehicle 202, the tracking engine 230 may determine that the certain candidate route may not be a valid candidate route and may discard it.

In another example, the tracking engine 230 may discard one or more of the candidate routes having a simulated pitch angle deviating by a certain threshold from a measured pitch angle computed for the vehicle 202 based on the motion data one or more of the plurality of time points time points $t_i \in T$ which, as described correspond to the plurality of location points $X_i$ (i=1, . . . , N). The tracking engine 230 may compute and/or estimate the pitch angle of the vehicle 202, expressing slope ascend or descend of the vehicle 202, at one or more of the time points $t_i$ based on analysis of the motion data. The tracking engine 230 may then analyze the map data to identify slope ascends and/or descends in one or more of the candidate routes and may compute, estimate, measure and/or otherwise determine the simulated pitch angle of a simulated vehicle travelling this candidate route(s). The tracking engine 230 may then discard one or more candidate routes which, at one or more of the time points $t_i$, have simulated pitch angle (value) that deviates by a certain threshold (e.g. 30%, 40%, 50%, etc.) from the pitch angle computed and/or measured for the vehicle 202 based on the motion data received from the vehicle 202.

Optionally, the tracking engine 230 may evaluate one or more off-road candidate routes for tracking he vehicle 202. The off-road candidate routes may not follow standard roads and may comprise one or more non-road segments where vehicles 202 may travel over paths or even bare terrain. To this end, the tracking engine 230 may analyze the map data which may comprise terrain data relating to potential off-road paths in the area surrounding the known initial location of the vehicle 202 to identify one or more off-road candidate routes. The tracking engine 230 may then compute a simulated heading angle time-series $\psi^{candidate}$ for each off-road candidate route and may compute a match score for each off-road candidate route, i.e., compute the difference $J_k$ between the simulated heading angle time-series $\psi^{candidate}$ of each off-road candidate route and the measured heading angle time-series $\psi^{true}$ as described herein before, for example, according to equation 4. The tracking engine 230 may further minimize the difference to identify the difference $J_{k_{min}}$ as described herein before, for example, according to equation 7. The tracking engine 230 may then rank the off-road candidate route(s) based on the match score ($J_k$).

As shown at 118, based on the ranking of the candidate routes, the tracking engine 230 may estimate a location of the vehicle 202.

For example, the tracking engine 230 may estimate the location of the vehicle 202 based on a final (last) location point and/or a most recently simulated location point extracted from the highest ranking candidate route. In another example, the tracking engine 230 may estimate a plurality of locations of the vehicle 202 based on the final location point and/or the most recently simulated location point extracted from multiple highest ranking candidate routes. Moreover, the tracking engine 230 may assign a probability score (weight) to each of the plurality of estimated locations of the vehicle 202, for example, based on the value of the difference $J_k$ computed for the corresponding candidate route, based on the order (position) of the candidate routes listed in the ordered list and/or the like.

The tracking engine 230 may be configured to execute the process 100 in one or more operation modes.

For example, in a first operation mode, the tracking engine 230 may execute the process 100 once after the vehicle 202 is identified to be in a complete stop for a predefined time period, for example, 5 minutes, 10 minutes, 15 minutes and/or the like when the vehicle 202 is assumed to arrive at to an at least temporary final (end) destination. In this operation mode, the tracking engine 230 may execute the process 100 to track the vehicle 202 and estimate its final location.

In another example, in a second operation mode, the tracking engine 230 may repeat the process 100 one or more times using newly received motion data from the vehicle 202, for example, every 10 minutes, every 15 minutes and/or the like. Using the new motion data, the tracking engine 230 may update and extend the measured heading angle time-series $\psi^{true}$ and may evaluate the match between the candidate routes extended based on the analysis of the map data and the updated measured heading angle time-series $\psi^{true}$. The tracking engine 230 may then update the ranking of the candidate routes and may estimate the location of the vehicle 202 accordingly.

Moreover, the tracking engine 230 may execute the process 100 in real time based on motion data of vehicle 202 that is currently captured and received from the vehicle 202. However, the tracking engine 230 may execute the process 100 afterwards (post event), and use the motion data received from the vehicle 202 to rank the candidate routes and estimate the final destination (location) of the vehicle 202.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms motion data, RF communication channel, AHRS algorithm, and optimization algorithm are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of computing an estimated location of ground vehicles having no access to geolocation services based on inertial measurement unit (IMU) data, comprising:

using a server configured for computing the estimated location of ground vehicles having no access to geolocation services by:
receiving, by the server, from at least one vehicle, via at least one radio frequency (RF) communication channel, motion data comprising at least acceleration and angular velocity captured periodically by at least one IMU deployed in the at least one vehicle in a plurality of time points starting from a known initial location of the at least one vehicle;
accumulating, by the server, the motion data;
computing, by the server, based on the accumulated motion data, a measured heading angle time-series of the at least one vehicle expressing a movement direction of the at least one vehicle at the plurality of time points;
identifying, by the server, a plurality of candidate routes based on analysis of map data of an area surrounding the known initial location;
simulating, by the server, based on the map data, a respective simulated heading angle time-series for each of the plurality of candidate routes, the respective simulated heading angle time-series comprising a plurality of heading angles at a plurality of location points distributed along the respective candidate route corresponding to the plurality of time points, each of the plurality of heading angles is determined according to a road geometry at a respective one of the plurality of location points;
computing, by the server, a match score for each of the plurality of candidate routes indicative of a match between the respective simulated heading angle time-series and the measured heading angle time-series, wherein computing the match score for each candidate route comprises:
aggregating the simulated heading angle at the plurality of location points of the respective candidate route according to the plurality of time points to generate the respective simulated heading angle time-series,
computing a difference, at each of the plurality of time points, between a value of the heading angle of the respective simulated heading angle time-series and a value of the heading angle of the measured heading angle time-series, and
minimizing the difference by adjusting a distribution of the plurality of location points in the respective candidate route to reflect a different simulated speed;
ranking, by the server, the plurality of candidate routes according to the match score of their simulated heading angle time-series; and
determining, by the server, an estimated location of the at least one vehicle based on a current location of the at least one vehicle extracted from at least one highest ranking candidate route of the plurality of candidate routes.

2. The method of claim 1, further comprising locally storing the motion data in the at least one vehicle while the at least one RF communication channel is unavailable, and transmitting the stored motion data when communication via the at least one RF communication channel is resumed.

3. The method of claim 1, further comprising receiving the motion data in a plurality of data segments each comprising a respective subset of the motion data captured by the at least one IMU in a subset of the plurality of time points, and combining the plurality of data segments to restore the motion data.

4. The method of claim 1, further comprising retrieving the map data from at least one of: a local storage, and an online mapping service.

5. The method of claim 1, wherein minimizing the difference further comprises minimizing the difference with respect to a constant offset between an initial heading angle assumed for the respective simulated heading angle time-series and an actual heading angle of the measured heading angle time-series when the motion data does not include an initial heading angle.

6. The method of claim 5, further comprising selecting at least one estimated initial heading angle according to road geometry at the known initial location determined based on analysis of the map data at the known initial location.

7. The method of claim 1, further comprising calibrating the at least one IMU according to frame of reference of the at least one vehicle.

8. The method of claim 1, further comprising creating an ordered list of a predefined number of candidate routes of the plurality of candidate routes based on the ranking.

9. The method of claim 1, further comprising updating the measured heading angle time-series according to newly received motion data and repeating estimation of the location of the at least one vehicle based on the updated measured heading angle time-series.

10. The method of claim 1, wherein the motion data captured by the at least one IMU further comprises heading data expressing a heading of the at least one vehicle with respect to a reference direction.

11. The method of claim 1, wherein the motion data captured by the at least one IMU further comprises velocity data expressing a velocity of the at least one vehicle.

12. The method of claim 1, further comprising discarding at least one of the plurality of candidate routes expressing an unrealistic velocity of the at least one vehicle which exceeds a maximal velocity of the at least one vehicle, and the unrealistic velocity is measured based on a distance between location points extracted from the map data.

13. The method of claim 1, further comprising discarding at least one of the plurality of candidate routes which either: (i) does not cross at least one geographical location identified for the at least one vehicle, or (ii) crosses the at least one geographical location at a time deviating by more than a certain threshold from a time reported for the at least one vehicle being at the at least one geographical location, and the at least one geographical location is identified based on geolocation data captured by at least one geolocation sensor deployed in the at least one vehicle.

14. The method of claim 1, further comprising discarding at least one of the plurality of candidate routes having a simulated pitch angle deviating by a certain threshold from a measured pitch angle computed for the at least one vehicle based on the motion data in at least one of the plurality of time points, and the pitch angle expresses a slope ascend or descend of the at least one vehicle.

15. The method of claim 1, further comprising evaluating at least one off-road candidate route by:
   analyzing the map data of the area surrounding the known initial location to identify the at least one off-road candidate route, the map data comprising terrain data relating to potential off-road paths in the area surrounding the known initial location,
   computing a respective simulated heading angle time-series of a simulated vehicle moving in the at least one off-road candidate route, and
   ranking the at least one off-road candidate route based on the match between its simulated heading angle time-series and the measured heading angle time-series.

16. The method of claim 1, wherein the at least one vehicle is a stolen vehicle and the estimated location of the at least one vehicle is determined to track the stolen vehicle.

17. A system for computing an estimated location of ground vehicles having no access to geolocation services based on inertial measurement unit (IMU) data, comprising:
   a server configured to execute a code for computing the estimated location of ground vehicles having no access to geolocation services, the code comprising:
      code instructions to receive, by the server, from at least one vehicle, via at least one radio frequency (RF) communication channel, motion data comprising at least acceleration and angular velocity captured periodically by at least one IMU deployed in at least one vehicle, in a plurality of time points starting from a known initial location of the at least one vehicle;
      code instructions to accumulate, by the server, the motion data;
      code instructions to compute, based on the accumulated motion data, a measured heading angle time-series of the at least one vehicle expressing a movement direction of the at least one vehicle at the plurality of time;
      code instructions to identify, by the server, a plurality of candidate routes bases on analysis of map data of an area surrounding the known initial location;
      code instructions to simulate, by the server, based on the map data, a respective simulated heading angle time-series for each of the plurality of candidate routes, the respective simulated heading angle time-series comprising a plurality of heading angles at a plurality of location points distributed along the respective candidate route corresponding to the plurality of time points, each of the plurality of heading angles is determined according to a road geometry at a respective one of the plurality of location points;
      code instructions to compute, by the server, a match score for each of the plurality of candidate routes indicative of a match between the respective simulated heading angle time-series and the measured heading angle time-series, wherein computing the match score for each candidate route comprises:
         aggregating the simulated heading angle at the plurality of location points of the respective candidate route according to the plurality of time points to generate the respective simulated heading angle time-series,
         computing a difference, at each of the plurality of time points, between a value of the heading angle of the respective simulated heading angle time-series and a value of the heading angle of the measured heading angle time-series, and
         minimizing the difference by adjusting a distribution of the plurality of location points in the respective candidate route to reflect a different simulated speed;
      code instructions to rank, by the server, the plurality of candidate routes according to the match score of their simulated heading angle time-series; and
      code instructions to compute an estimated location of the at least one vehicle based on a current location of the at least one vehicle extracted from at least one highest ranking candidate route of the plurality of candidate routes.

\* \* \* \* \*